United States Patent
Saito

(10) Patent No.: US 8,174,563 B2
(45) Date of Patent: May 8, 2012

(54) OBJECT DETECTING SYSTEM

(75) Inventor: Toru Saito, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 861 days.

(21) Appl. No.: 12/260,640

(22) Filed: Oct. 29, 2008

(65) Prior Publication Data

US 2009/0237491 A1    Sep. 24, 2009

(30) Foreign Application Priority Data

Oct. 29, 2007   (JP) ................................ 2007-280470

(51) Int. Cl.
*H04N 13/02* (2006.01)
*H04N 5/225* (2006.01)
*G06K 9/00* (2006.01)

(52) U.S. Cl. ........................ 348/47; 348/169; 382/154

(58) Field of Classification Search .............. 348/47, 348/135, 169–172; 382/103, 104, 106, 154
See application file for complete search history.

(56) References Cited

U.S. PATENT DOCUMENTS

| | | | | |
|---|---|---|---|---|
| 5,867,591 A | * | 2/1999 | Onda | 382/154 |
| 6,125,198 A | * | 9/2000 | Onda | 382/154 |
| 7,092,015 B1 | * | 8/2006 | Sogawa | 348/222.1 |
| 7,545,974 B2 | * | 6/2009 | Jeong et al. | 382/154 |
| 8,009,897 B2 | * | 8/2011 | Xu et al. | 382/154 |

FOREIGN PATENT DOCUMENTS

| | | |
|---|---|---|
| JP | 05-114099 | 5/1993 |
| JP | 05-265547 | 10/1993 |
| JP | 06-266828 | 9/1994 |
| JP | 10-283461 | 10/1998 |
| JP | 10-283477 | 10/1998 |
| JP | 2004-234423 | 8/2004 |
| JP | 2006-072495 | 3/2006 |

\* cited by examiner

*Primary Examiner* — Yemane Mesfin
(74) *Attorney, Agent, or Firm* — Smith, Gambrell & Russell, LLP

(57) ABSTRACT

An object detecting system includes stereo-image taking means for taking images of an object and outputting the images as a reference image and a comparative image, stereo matching means for calculating parallaxes by stereo matching, and determination means for setting regions of objects in the reference image on the basis of the parallaxes grouped by grouping means, and performing stereo matching again for an area on the left side of a comparative pixel block specified on an epipolar line in the comparative image corresponding to a reference pixel block in a left end portion of each region. When a comparative pixel block that is different from the specified comparative pixel block and provides the local minimum SAD value less than or equal to a threshold value is detected, the determination means determines that the object in the region is mismatched.

9 Claims, 18 Drawing Sheets

$T_o$ $T_c$

OBJECT DETECTING SYSTEM

CROSS-REFERENCE TO RELATED APPLICATIONS

The disclosure of Japanese Patent Application No. 2007-280470 filed on Oct. 29, 2007 including the specification, drawings and abstract is incorporated herein by reference in its entirety.

BACKGROUND OF THE INVENTION

1. Field of the Invention

The present invention relates to object detecting systems, and more particularly, to an object detecting system that detects an object by stereo matching of a pair of images taken by stereo-image taking means.

2. Description of the Related Art

In general, in order to measure the distance to an object with a stereo camera, a pair of images are taken by a pair of right and left cameras that are mounted at the same height, and one of the taken images used for reference (hereinafter referred to as a reference image) is compared with the other image (hereinafter referred to as a comparative image). By comparison, a difference between positions of corresponding portions of the same object in the images, that is, a parallax is calculated, and the distance to the object is calculated from the parallax. The portions in the reference image and the comparative image where an image of the same object is taken are typically located by stereo matching (for example, see Japanese Unexamined Patent Application Publication No. 2004-234423).

In stereo matching, as shown in FIG. 22, a reference image $T_O$ is divided into small regions (hereinafter referred to as reference pixel blocks $PB_O$) defined by a predetermined number of pixels, such as 3 by 3 pixels or 4 by 4 pixels, and a luminance pattern of each reference pixel block $PB_O$ is compared with a luminance pattern of each comparative pixel block $PB_C$, which has the same shape of the reference pixel block $PB_O$, on an epipolar line EPL in a comparative image $T_C$ provided corresponding to the reference pixel block $PB_O$.

In this case, for example, when a luminance of each pixel in the reference pixel block $PB_O$ is designated as p1st and a luminance of each pixel in the comparative pixel block $PB_C$ is designated as p2st, a SAD (Sum of Absolute Difference) value is calculated as a difference in the luminance pattern according to the following Expression (1):

$$SAD = \sum_{s,t} |p1st - p2st| \quad (1)$$

In Expression (1) described above, for example, a SAD value is calculated for all pixels in a region where $1 \leq s \leq 3$ and $1 \leq t \leq 3$ when each of the reference pixel block $PB_O$ and the comparative pixel block $PB_C$ is set as a region defined by 3 by 3 pixels, and for all pixels in a region where $1 \leq s \leq 4$ and $1 \leq t \leq 4$ when each of the reference pixel block $PB_O$ and the comparative pixel block $PB_C$ is set as a region defined by 4 by 4 pixels.

A comparative pixel block $PB_C$ that provides the smallest SAD value is specified as a comparative pixel block in the comparative image $T_C$ that includes an image of the same object as that included in the reference pixel block $PB_O$. Using the result of stereo matching, a parallax between the specified comparative pixel block $PB_C$ and the original reference pixel block $PB_O$ is calculated, and the distance to the object is calculated on the basis of the parallax according to the principle of triangulation.

For example, a reference image $T_O$ shown in FIG. 23A and a comparative image $T_C$ shown in FIG. 23B are images of the same object O (vehicle), which exists in front of a vehicle in which a stereo camera is mounted, taken by the stereo camera. Consideration will now be taken of stereo matching performed for images of the object O in which similar brightness patterns are thus arranged at regular intervals.

For example, while shifting a comparative pixel block $PB_C$ on an epipolar line EPL in the comparative image $T_C$ one by one from left to right correspondingly to a reference pixel block $PB_O(p)$ set in a portion of the object O in the reference image $T_O$ where the luminance pattern is repeated, SAD value is calculated according to Expression (1) described above. Then, comparative pixel blocks $PB_C(a)$, $PB_C(b)$, $PB_C(c)$, ... where the SAD value is locally minimized and a downward-pointing peak is provided, sequentially appear, as shown in FIG. 24 serving as a graph.

When a SAD value SAD(c) of the comparative pixel block $PB_C(c)$ is less than a SAD value SAD(a) of the comparative pixel block $PB_C(a)$ that is supposed to be specified, the comparative pixel block $PB_C(c)$ is undesirably specified, in other words, so-called mismatching occurs.

If a parallax is calculated in spite of mismatching, a wrong distance to the object is calculated. For example, although an image of the same object O is taken, as shown in FIGS. 23A and 23B, since a calculated distance to a portion of the object O is wrong, the portion of the object O is erroneously detected as another object Oa having a distance different from the difference to the object O, as shown in FIG. 25.

Such erroneous object detection due to mismatching can occur not only when similar luminance patterns are arranged in a taken image, as shown in FIGS. 23A and 23B, but also when similar luminance patterns are arranged at regular intervals in an image of an object such as a fence or a wall.

For example, if such erroneous object detection occurs in an object detecting system mounted in the vehicle so as to follow a preceding vehicle, particularly when another object is erroneously detected at a position closer than the preceding vehicle, information about the erroneous detection is transmitted to a preceding-vehicle follow-up system in an ECU (Electric Control Unit) of the vehicle, and as a result, unnecessary braking is performed automatically.

In order to solve this problem, the above-described publication discloses a method and system for outputting reliability of a parallax in accordance with the sharpness and distribution condition of the peaks of a SAD value. Unfortunately, much processing time is taken to calculate the reliability of the parallax in this method and system. Moreover, when an object having a luminance pattern in which peaks of the SAD value are easily erroneously specified is detected, as shown in FIGS. 23A and 23B, the total reliability decreases. Therefore, even when the distance calculated on the basis of the parallax is correct, reliability thereof is low, and it is difficult to determine whether the obtained result is correct or wrong.

SUMMARY OF THE INVENTION

The present invention has been made in view of these circumstances, and an object of the invention is to provide an object detecting system that can accurately distinguish an object erroneously detected by mismatching, from objects detected by stereo matching.

In order to solve the above-described problems, an object detecting system according to an aspect of the present invention includes stereo-image taking means for simultaneously taking images of an object by a pair of right and left cameras mounted at the same height and outputting the images as a reference image and a comparative image; stereo matching means for performing stereo matching so that a reference pixel block having a predetermined number of pixels is set in the reference image and differences in luminance pattern between the reference pixel block and comparative pixel blocks are calculated according to a predetermined calculation expression, the comparative pixel blocks having the same shape as that of the reference pixel block on an epipolar line in the comparative image and being corresponding to the reference pixel block, and so that a comparative pixel block having the smallest difference is specified, the stereo matching means calculating a parallax from a position of the specified comparative pixel block in the comparative image and a position of the reference pixel block in the reference image, the parallax being calculated for each reference pixel block; grouping means for grouping the parallaxes regarded as corresponding to the same object on the basis of the parallaxes of the reference pixel blocks; and determination means for detecting objects in the reference image on the basis of the grouped parallaxes and setting regions including images of the objects, selecting a reference pixel block belonging to a left end portion or a right end portion of each of the regions, performing stereo matching again for an area on the right or left side of a comparative pixel block, which is specified in the comparative image corresponding to the reference pixel block, on an epipolar line including the specified comparative pixel block, and determining that the object in the region is mismatched when a comparative pixel block that is different from the specified comparative pixel block and provides the local minimum difference less than or equal to a preset threshold value is detected.

In this case, for objects detected in the reference image by stereo matching based on the reference image and the comparative image taken by the stereo-image taking means, a reference pixel block belonging to a right or left end portion of a section in the reference image including an image of each object is selected, and stereo matching is performed again for an area on the right or left side of a comparative pixel block, which is specified in the comparative image corresponding to the reference pixel block, on an epipolar line including the specified comparative pixel block. When a comparative pixel block, which is different from the specified comparative pixel block and provides the local minimum difference, such as SAD value, less than or equal to the preset threshold value, is detected for the object, the object is judged mismatched.

With this configuration, for images of an object that have similar luminance patterns arranged at regular intervals and that are susceptible to mismatching, as shown in FIGS. 23A and 23B, when a comparative pixel block, which provides the local minimum difference less than or equal to the threshold value, is detected in an area on the right or left side of the specified comparative pixel block by stereo matching performed, the object is judged mismatched. This allows an object erroneously detected by mismatching to be distinguished accurately.

For this reason, for example, when the object detecting system is mounted in the vehicle so as to follow the preceding vehicle, it is possible to avoid a situation where the preceding-vehicle follow-up system is started and unnecessary braking is automatically performed because of erroneous object detection. Moreover, by appropriately setting the threshold value, erroneous object detection due to mismatching can be distinguished easily and reliably.

Preferably, the predetermined calculation expression is provided to calculate, as the difference, a SAD value of a luminance for all pixels in the reference pixel block and the comparative pixel block according to the following expression:

$$SAD = \sum_{s,t} |p1st - p2st|$$

where p1st represents the luminance of the pixel in the reference pixel block and p2st represents the luminance of the pixel in the comparative pixel block.

In this case, stereo matching is performed by the stereo matching means on the basis of the SAD value calculated according to the above expression, and stereo matching is performed again by the determination means. Therefore, the operations can be easily performed, and it is possible to easily and accurately determine whether a comparative pixel block that satisfies the above-described condition exists other than the comparative pixel block specified in the area on the epipolar line by stereo matching performed again by the determination means. This allows the above-described advantages of the present invention to be achieved easily and accurately.

Preferably, the determination means performs stereo matching again for all of or a plurality number of reference pixel blocks, of the reference pixel blocks belonging to the right or left end portion of the region including each of the objects detected in the reference image. The determination means judges the object mismatched when positions of the comparative pixel blocks that correspond to the reference pixel blocks and provide the local minimum differences less than or equal to the threshold value concentrate in the comparative image.

In this case, a plurality of reference pixel blocks belonging to the right or left end portion of each region in the reference image including the image of the object, and are subjected again to stereo matching. This allows more reliable judgment of mismatching, and the above-described advantages of the present invention are achieved more reliably.

Preferably, the determination means removes the object judged mismatched from the detected objects.

In this case, since the object judged mismatched is removed from the detected objects, an erroneously detected object is prevented from being included in the detected objects. Therefore, in addition to the above-described advantages of the present invention, reliability of object detection can be improved further.

Preferably, by the stereo matching performed again on the epipolar line including the comparative pixel block specified in the comparative image corresponding to the reference pixel block belonging to the right or left end portion of the region including the object judged mismatched, the determination means calculates a parallax from a position in the comparative image of the comparative pixel block that is different from the specified comparative pixel block and provides the local minimum difference less than or equal to the threshold value and a position in the reference image of the reference pixel block. When the object judged mismatched exists at a distance in real space calculated from the calculated parallax and when the distance coincides with a distance in real space of any other detected object within a predetermined error range, the determination means determines that the object judged mismatched is the same as the any other detected object.

In this case, it is determined that the object judged mismatched is the same as the other detected object, by utilizing information about the comparative pixel block that is different from the comparative pixel block specified on the epipolar line including the specified comparative pixel block. Therefore, it is possible to effectively utilize information about the mismatched object, and to accurately obtain information about the object, which has been detected as a plurality of objects, as information about the single object. In addition to the above-described advantages of the present invention, reliability of object detection can be improved further.

Preferably, when a plurality of comparative pixel blocks that are different from the specified comparative pixel block and provide the local minimum differences less than or equal to the threshold value exist, the judgment of coincidence is made for all comparative pixel blocks except the specified pixel block.

In this case, when a plurality of comparative pixel blocks that are different from the specified comparative pixel block and provide the local minimum differences less than or equal to the threshold value exist, it can be determined that the object judged mismatched is the same as another object coincident therewith, by utilizing information about all comparative pixel blocks. Therefore, the above-described advantages can be more accurately achieved, and reliability of the judgment of coincidence can be improved.

Preferably, the any other detected object judged for coincidence is an object detected near the object judged mismatched in the reference image.

In this case, the any other detected object judged for coincidence is an object detected near the object judged mismatched in the reference image. Therefore, judgment of coincidence can be performed within a reasonable range in the reference image. This can improve reliability of judgment of coincidence, and the above-described advantages of the present invention are achieved more accurately.

Preferably, when information about a comparative pixel block that provides the local minimum difference less than or equal to the threshold value and is obtained by stereo matching performed again for an object judged mismatched in the current sampling period includes information close to information about a comparative pixel block that provides the local minimum difference less than or equal to the threshold value and is obtained by stereo matching performed again for an object detected in the previous sampling period corresponding to the object judged mismatched, the determination means improves reliability of determination in the current sampling period that the object is mismatched.

In this case, when information about a comparative pixel block that provides the local minimum difference less than or equal to the threshold value and is obtained by stereo matching performed again for an object judged mismatched in the current sampling period includes information close to information about a comparative pixel block that provides the local minimum difference less than or equal to the threshold value and is obtained by stereo matching performed again for an object detected in the previous sampling period corresponding to the object judged mismatched, reliability of determination in the current sampling period that the object is mismatched is increased. This makes it possible to further improve reliability of object detection, and to accurately perform removal of the object judged mismatched and coincidence with another object. Therefore, the above-described advantages of the present invention are achieved more accurately.

Preferably, the determination means increases or decreases the luminance of the reference image and/or the comparative image on the basis of the calculated difference.

In this case, since the luminance of the reference image and/or the comparative image is increased or decreased on the basis of the calculated difference, it is possible to increase the possibility that a correct comparative pixel block will be specified corresponding to the reference pixel block in the comparative image in the next sampling period. Therefore, in addition to the above-described advantages of the present invention, the occurrence of mismatching can be reduced, and reliability of object detection can be improved further.

DESCRIPTION OF THE PREFERRED EMBODIMENTS

An object detecting system according to an embodiment of the present invention will be described below with reference to the drawings.

The following description will be given of a case in which an object detecting system is mounted in a vehicle so as to detect objects on or around the road. However, the object detecting system according to the present invention is also applicable to other cases.

Figure 1:
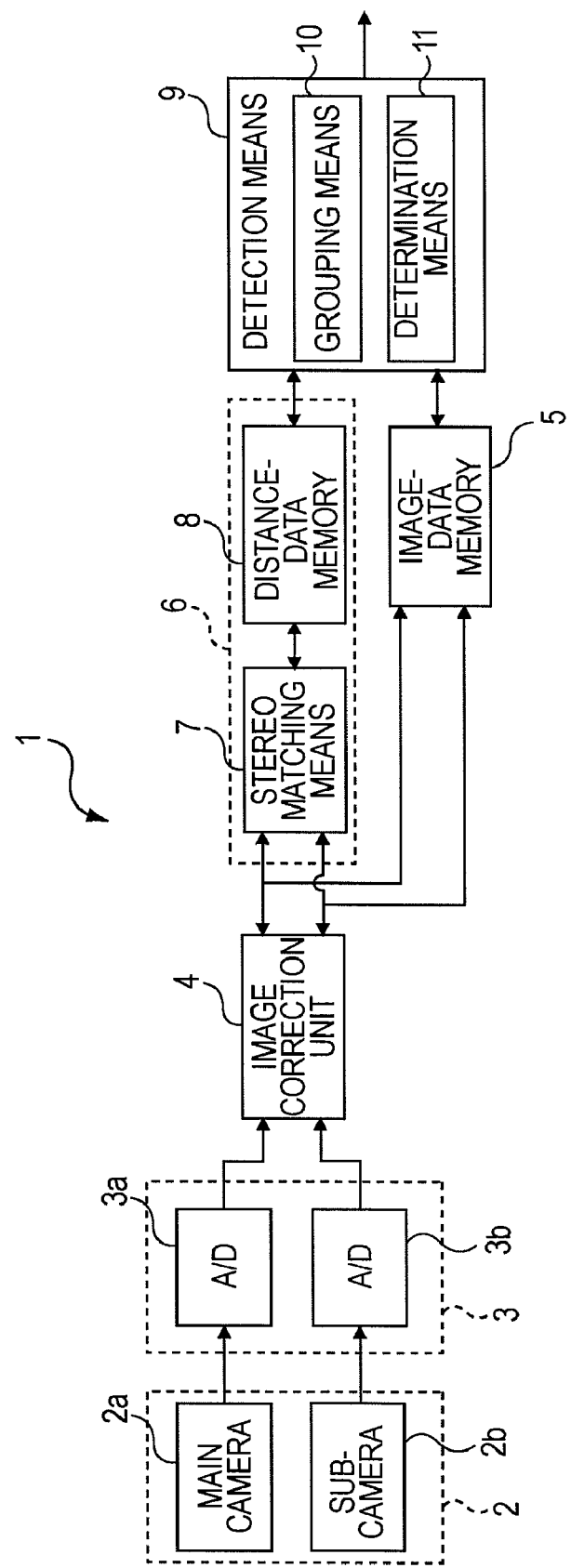
FIG. 1 is a block diagram showing a configuration of an object detecting system according to an embodiment.

Referring to FIG. 1, an object detecting system 1 according to the embodiment includes a stereo-image taking means 2, a conversion means 3, an image processing means 6, and a detection means 9.

The structures from the stereo-image taking means 2 to a grouping means 10 in the detection means 9 have been described in detail in Japanese Unexamined Patent Application Publication Nos. 5-114099, 5-265547, 6-266828, 10-283461, 10-283477, and 2006-72495 filed earlier by the present applicant. Therefore, the structures will now be described briefly.

In this embodiment, the stereo-image taking means 2 is formed by a stereo camera including a main camera 2a and a sub-camera 2b mounted, for example, near a room mirror and spaced a predetermined distance apart in the vehicle width direction, that is, in the right-left direction. The main camera 2a and the sub-camera 2b respectively include image sensors, such as CCDs or CMOS sensors, which are in synchronization with each other.

Figure 2:
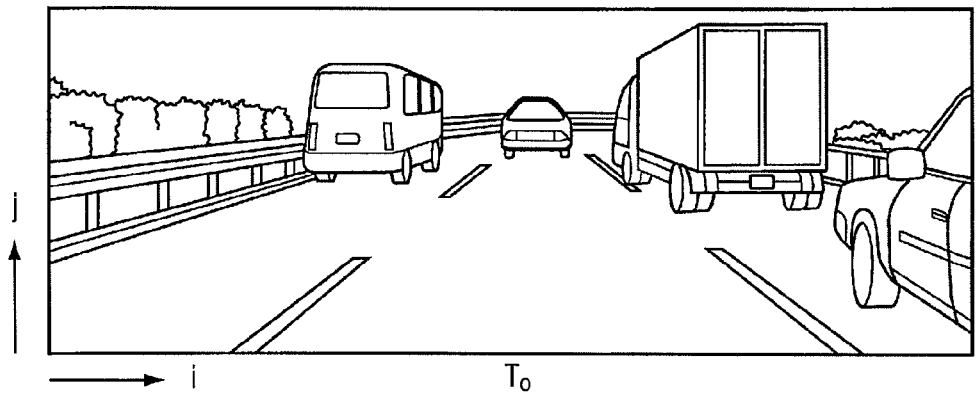
FIG. 2 shows an example of a reference image.

The main camera 2a and the sub-camera 2b are mounted at the same height from the road surface, simultaneously take images of an object in front of the vehicle at a predetermined sampling cycle, and output information about the taken images. The main camera 2a close to the driver (on the right side of the vehicle in this embodiment) outputs image data on a reference image $T_O$ shown in FIG. 2, and the sub-camera 2b remote from the driver (on the left side of the vehicle in this embodiment) outputs image data on a comparative image $T_C$ that is not shown.

Image data output from the main camera 2a and the sub-camera 2b are converted from analog images into digital images in which each pixel has a luminance of a predetermined number of, for example, 256 levels of gray scale by A/D converters 3a and 3b in the conversion means 3. The digital images are subjected to image correction, such as displacement and noise removal, by an image correction unit 4. After image correction, the image data is transmitted to and stored in an image-data memory 5, and is also transmitted to the image processing means 6.

The image processing means 6 includes a stereo matching means 7, such as an image processor, and a distance-data memory 8.

The stereo matching means 7 performs stereo matching by the method that has been described with reference to FIG. 22. More specifically, the stereo matching means 7 sets a reference pixel block $PB_O$ defined by a predetermined number of pixels, such as 3 by 3 pixels or 4 by 4 pixels, in a reference image $T_O$, and shifts comparative pixel blocks $PB_C$ having the same shape as that of the reference pixel block $PB_O$ on an epipolar line EPL in a comparative image $T_C$ corresponding to the reference pixel block $PB_O$ one pixel by one pixel from left to right. Then, the stereo matching means 7 calculates differences in luminance pattern between the reference pixel block $PB_O$ and the comparative pixel blocks $PB_C$, and specifies a comparative pixel block $PB_C$ having the global minimum difference.

While a SAD value given by Expression (1) described above is used as the difference in this embodiment, for example, the sum of squares of the difference between a luminance value p1st of the pixel in the reference pixel block $PB_O$ and a luminance value p2st of the pixel in the comparative pixel block $PB_C$ can be used as the difference. Further, the difference in the luminance pattern between the reference pixel block $PB_O$ and the comparative pixel block $PB_C$ can be calculated according to other expressions as long as proper calculation is possible.

The stereo matching means 7 also calculates a parallax dp from the position of the comparative pixel block $PB_C$ in the comparative image $T_C$ specified by stereo matching and the position of the reference pixel block $PB_O$ in the reference image $T_O$. The above-described operations are performed for all reference pixel blocks $PB_O$ in the reference image $T_O$, and a parallax dp is calculated for each reference pixel block $PB_O$.

Figure 3:
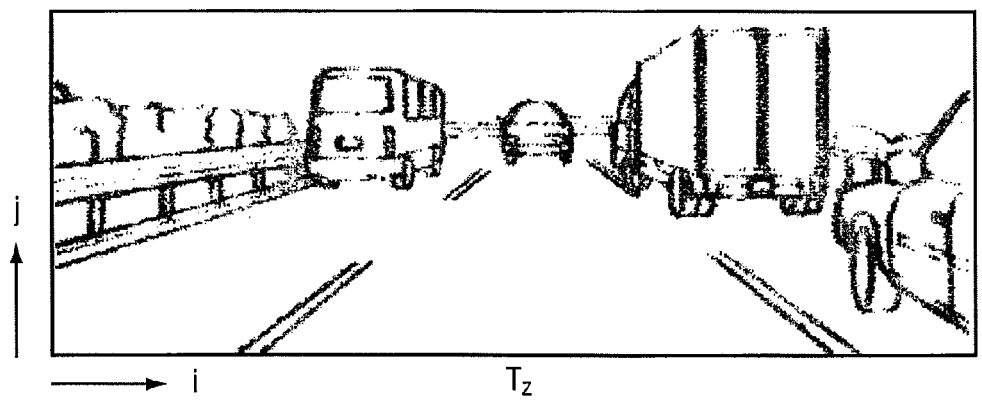
FIG. 3 shows a distance image formed on the basis of the reference image shown in FIG. 2.

The stereo matching means 7 stores information about the parallax dp thus calculated for each reference pixel block $PB_O$ in the distance-data memory 8. Hereinafter, an image formed by assigning parallaxes dp to the reference pixel blocks $PB_O$ in the reference image $T_O$, as shown in FIG. 3 will be referred to as a distance image $T_Z$.

In order to improve reliability of the parallaxes dp, the stereo matching means 7 subjects the parallaxes dp thus obtained to filtering, and outputs only effective parallaxes dp. In other words, when the reference pixel block $PB_O$ has a poor characteristic in luminance pattern, for example, when the reference pixel block $PB_O$ includes only an image of the road, SAD values of the comparative pixel blocks $PB_C$ obtained by scanning the epipolar line EPL in the comparative image $T_C$ are not greatly different, and reliability of the specified comparative pixel block $PB_C$ is not necessarily high. For this reason, it is determined in the above-described filtering process that the parallax dp of the reference pixel block $PB_O$ is invalid, and a value 0 is output as the parallax dp for the reference pixel block $PB_O$.

Therefore, in a normal distance image $T_Z$ output from the stereo matching means 7, the difference in luminance p1st between pixels adjoining in the right-left direction in the reference image $T_O$ is large, that is, parallaxes dp are effective for the reference pixel blocks $PB_O$ at edges of the object.

The point (X, Y, Z) in real space, the parallax dp, and the point (i, j) in the distance image $T_Z$ can be uniquely correlated by coordinate conversion given by the following Expressions (2) to (4) according to the principle of triangulation:

$$X = CD/2 + Z \times PW \times (i - IV) \quad (2)$$

$$Y = CH + Z \times PW \times (j - JV) \quad (3)$$

$$Z = CD/(PW \times (dp - DP)) \qquad (4)$$

where a point on the road surface just below the midpoint between the main camera 2a and the sub-camera 2b is designated as the origin, the X-axis indicates the width direction, that is, the right-left direction of the vehicle, the Y-axis indicates the vehicle height direction, and the Z-axis indicates the vehicle length direction, that is, the front-rear direction.

In these expressions, CD represents the distance between the main camera 2a and the sub-camera 2b, PW represents the viewing angle for one pixel, CH represents the mounting height of the main camera 2a and the sub-camera 2b, IV and JV respectively represent i and j coordinates in the distance image $T_Z$ of the point at infinity in front of the vehicle, and DP represents the vanishing point parallax.

Therefore, in this embodiment, the operations are performed on the basis of the parallaxes dp using the distance image $T_Z$ formed by assigning the parallaxes dp to the reference pixel blocks $PB_0$ in the reference image $T_0$, as described above. Alternatively, the parallaxes dp can be converted into distances Z beforehand according to Expression (4) described above, and the operations can be performed on the basis of the distances Z using a distance image obtained by assigning the distances Z to the reference pixel blocks $PB_0$ in the reference image $T_0$.

The detection means 9 is formed by a microcomputer in which a CPU, a ROM, a RAM, an input/output interface, etc. (not shown) are connected to a bus. Although not shown, information, such as the vehicle speed, yaw rate, steering angle of the steering wheel, is input to the detection means 9, as necessary.

As shown in FIG. 1, the detection means 9 includes a grouping means 10 for detecting objects, and a determination means 11 for determining whether each object is detected by mismatching. The detection means 9 also includes a memory that is not shown.

In this embodiment, the grouping means 10 is based on the vehicle surroundings monitoring apparatus disclosed in, for example, Japanese Unexamined Patent Application Publication No. 10-283461, as described above. Since detailed descriptions are given in the publication, the grouping means 10 will be briefly described below.

The grouping means 10 combines parallaxes dp of the reference pixel blocks $PB_0$, which are obtained by the above-described stereo matching and are supposed to correspond to the same object, into groups, thus detecting objects in the reference image $T_0$.

Figure 4:
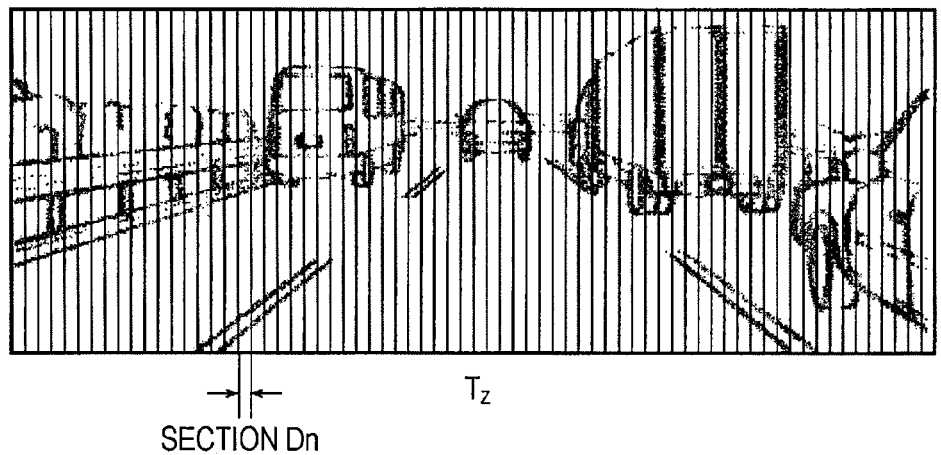
FIG. 4 explains strip sections of the distance image shown in FIG. 3.
Figure 5:
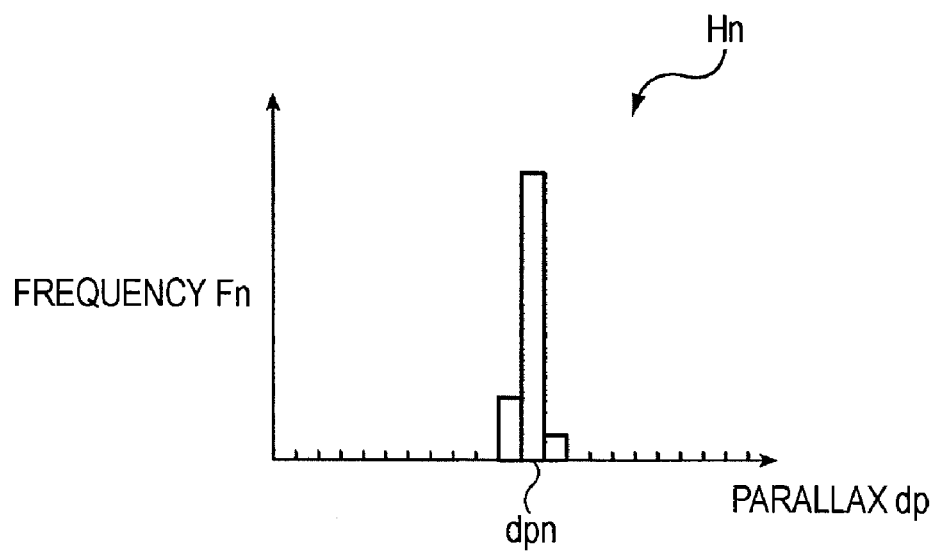
FIG. 5 explains a histogram formed in each section shown in FIG. 4.

More specifically, the grouping means 10 reads out the above-described distance image $T_Z$ from the distance-data memory 8, and divides the distance image $T_Z$ into vertical strip sections Dn having a predetermined pixel width, as shown in FIG. 4. Then, the grouping means 10 forms a histogram Hn related to parallaxes dp included in each strip section Dn, and sets a class having the highest frequency Fn as an object parallax dpn of the strip section dpn. This operation is performed for all sections Dn.

Figure 6:
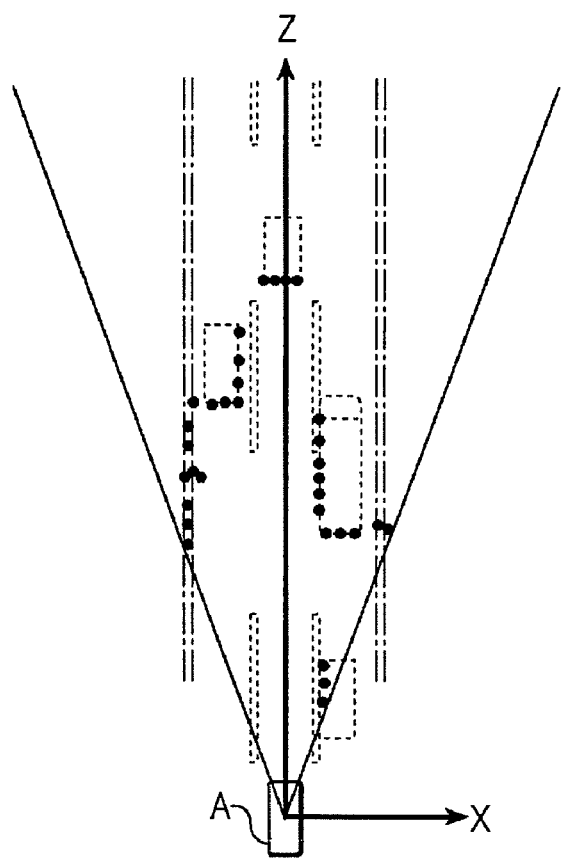
FIG. 6 shows dots formed by plotting distances in the sections in real space.
Figure 7:
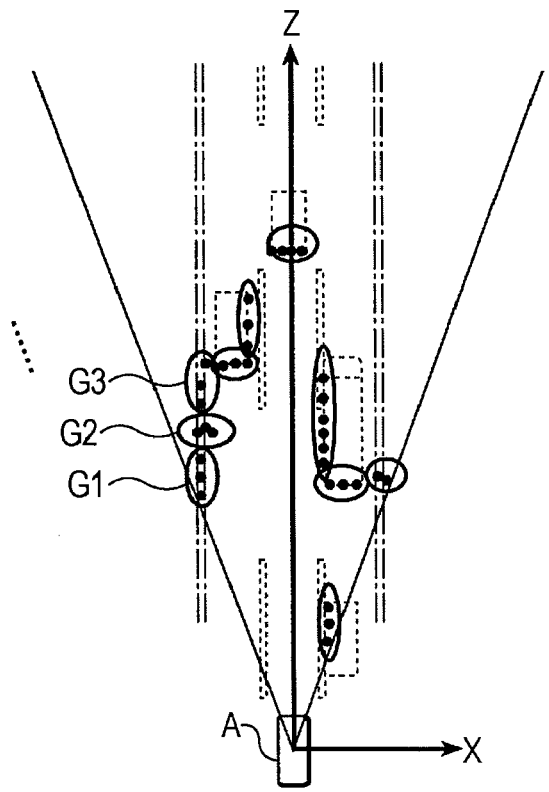
FIG. 7 shows groups obtained from the dots shown in FIG. 6.

Subsequently, the grouping means 10 substitutes the parallaxes dpn of the sections Dn into the above Expression (4), thus calculating distances Zn of the sections Dn in real space corresponding to the parallaxes dpn. The calculated distances Zn are plotted in real space, as shown in FIG. 6, and adjoining plotted dots are classified into groups G1, G2, G3, . . . on the basis of the distances between the plotted dots and directionality, as shown in FIG. 7.

Figure 8:
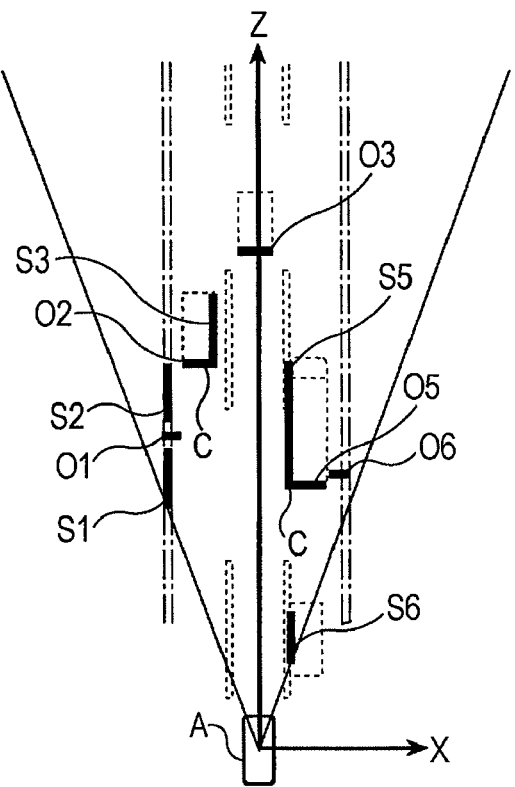
FIG. 8 shows straight lines obtained by approximation based on the dots in the groups shown in FIG. 7.

In this embodiment, the grouping means 10 linearly approximates the dots belonging to each group, as shown in FIG. 8. The grouping means 10 labels a group, in which the dots are arranged substantially parallel to the width direction of the vehicle A, that is, the X-axis direction, with an "object" O, and labels a group, in which the dots are arranged substantially parallel to the length direction of the vehicle A, that is, the Z-axis direction, with a "side wall" S. A point that can be regarded as an intersection of an "object" and a "side wall" of the same object is labeled with C as a corner point.

In the example shown in FIG. 8, the grouping means 10 detects, as one object, each of [Side Wall S1], [Object O1], [Side Wall S2], [Object O2, Corner Point C, Side Wall S3], [Side Wall S4], [Object O3], [Object O4], [Side Wall S5, Corner Point C, Object O5], [Object O6], and [Side Wall S6]. While "Object" and "Side Wall" are used as labels for convenience, as described above, "side wall" is also detected as an object.

The grouping means 10 stores information about the objects thus detected, that is, the coordinates of end points and a midpoint of an approximate line in each group, in the memory. Hereinafter, the parallax dp and the distance Z of the object refer to a parallax dp and a corresponding distance Z of a reference pixel block $PB_0$ corresponding to the midpoint of an approximate line of the object in each group.

Figure 9:
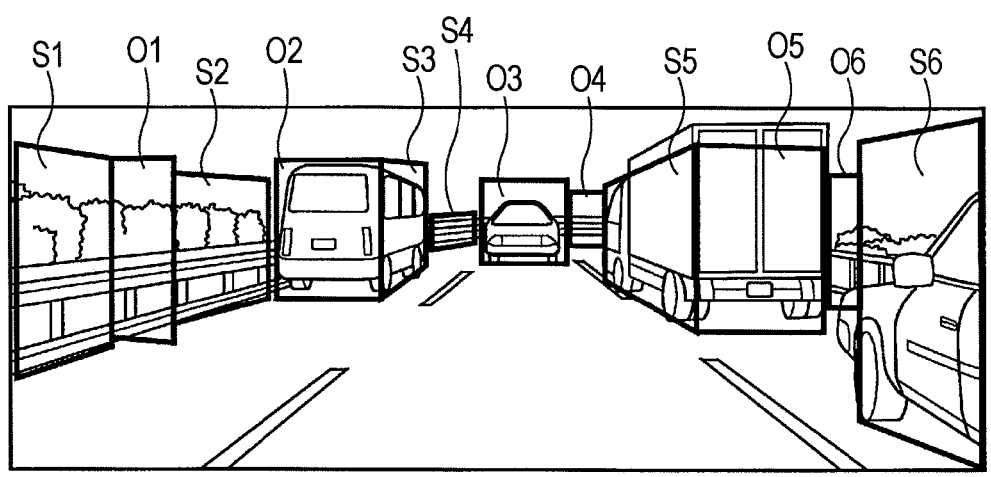
FIG. 9 shows detected objects enclosed by frames in the reference image.

As shown in FIG. 9, the determination means 11 sets regions, where images of the objects are taken, by setting rectangular frames that enclose the objects in the reference image $T_0$ on the basis of information about the objects detected by the grouping means 10, thus detecting the objects in the reference image $T_0$. The determination means 11 stores, in the memory, the coordinates of vertexes of the frames in the reference image $T_0$.

Descriptions will be given below of a method for judging mismatching in the determination means 11 and the operation of the object detecting system 1 according to this embodiment.

Figure 22:
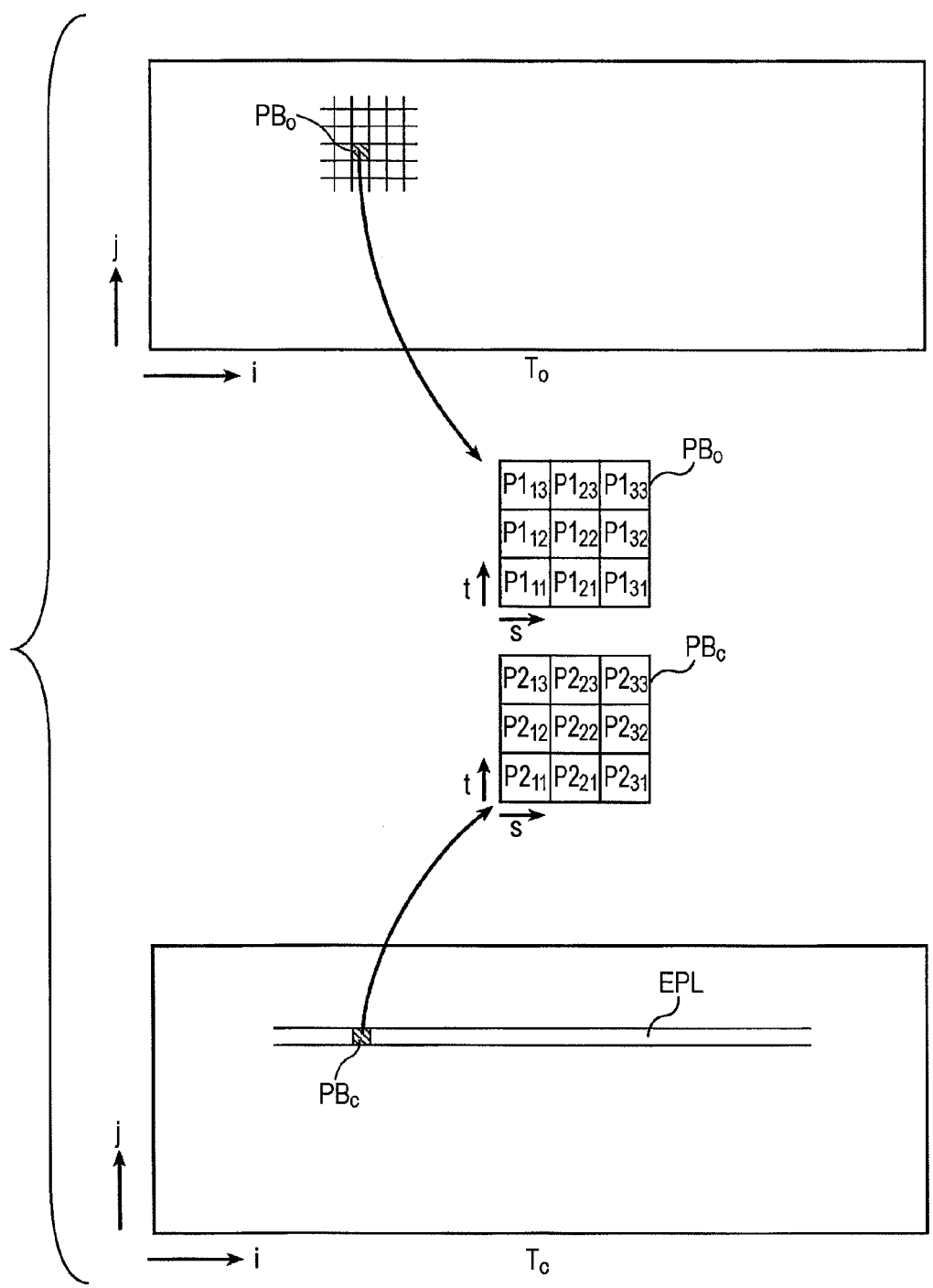
FIG. 22 explains how stereo matching is performed.
Figure 23A:
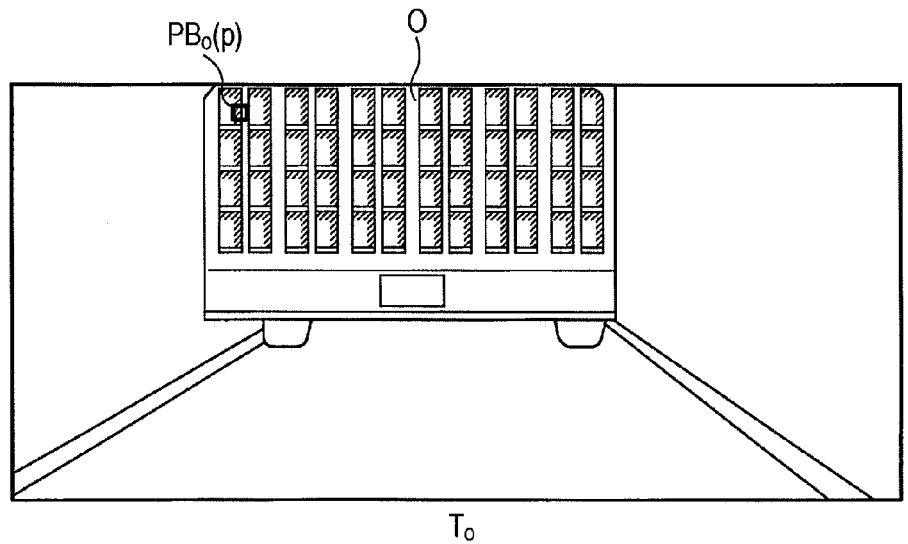
FIG. 23A shows an example of a reference image of an object in which similar luminance patterns are arranged at regular intervals.
Figure 23B:
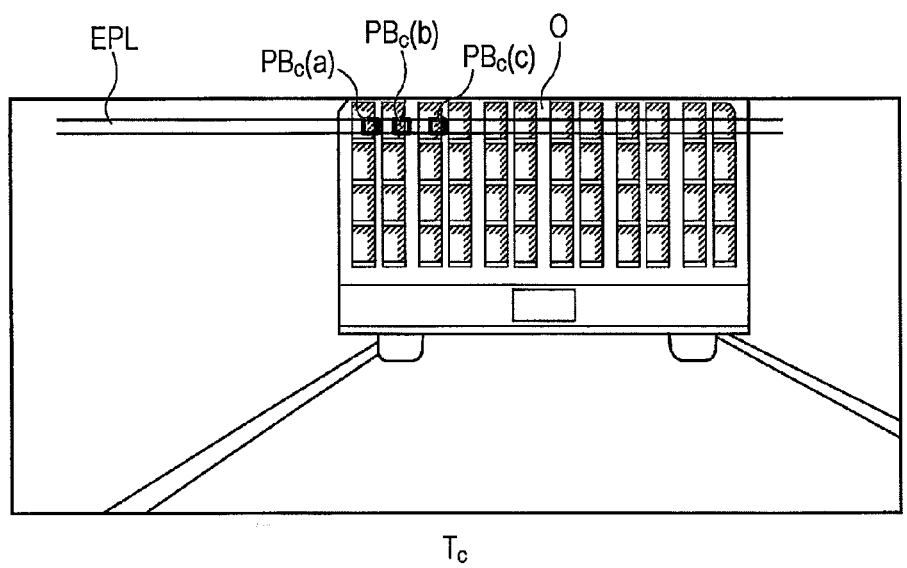
FIG. 23B shows an example of a comparative image corresponding to the reference image.

When the stereo matching means 7 performs stereo matching for a reference pixel block $PB_0(p)$ of an object O in which similar luminance patterns are arranged at regular intervals, as shown in FIGS. 23A and 23B, similarly to the manner shown in FIG. 22 and adopted in the above-described related art, comparative pixel blocks $PB_C(a)$, $PB_C(b)$, $PB_C(c)$, . . . , each of which has a downward pointing peak having the local minimum SAD value, sequentially appear in a graph of a SAD value given by Expression (1) described above, as shown in FIG. 24.

A SAD value SAD(c) is the smallest (global minimum value) in the comparative pixel block $PB_C(c)$ that is different from the comparative pixel block $PB_C(a)$ supposed to be specified, and the comparative pixel block $PB_C(c)$ is specified by mismatching. As a result, if parallaxes are calculated on the basis of this mismatching, a part of the object O is erroneously detected as another object Oa that is different in the distance Z from the original object O, as shown in FIG. 25.

Figure 10A:
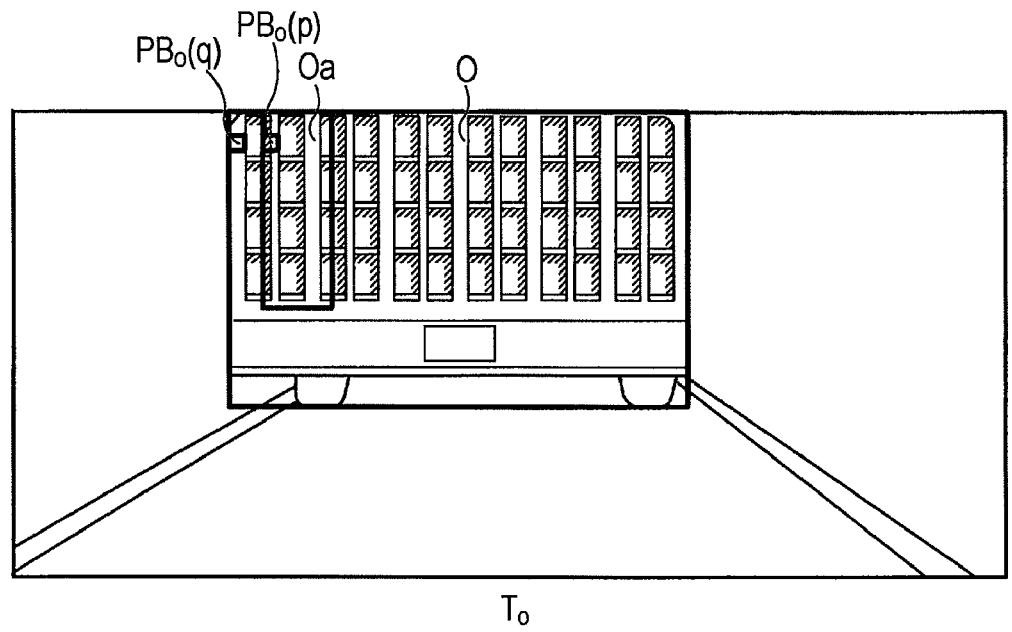
FIG. 10A shows an object erroneously detected in the reference image, and FIG. 10B explains how stereo matching is performed again in the comparative image.
Figure 10B:
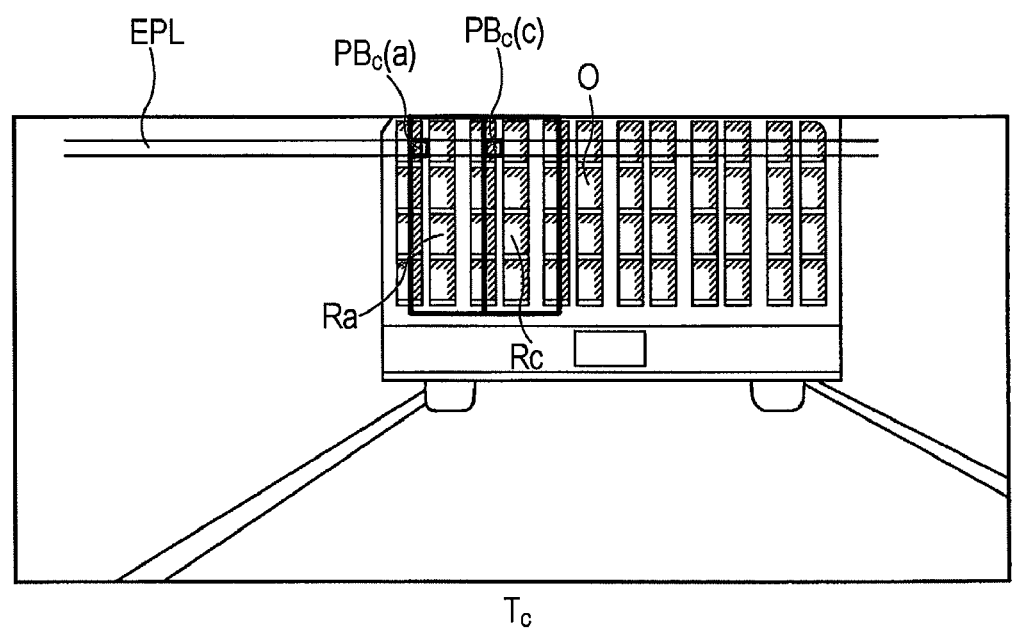
Figure 25:
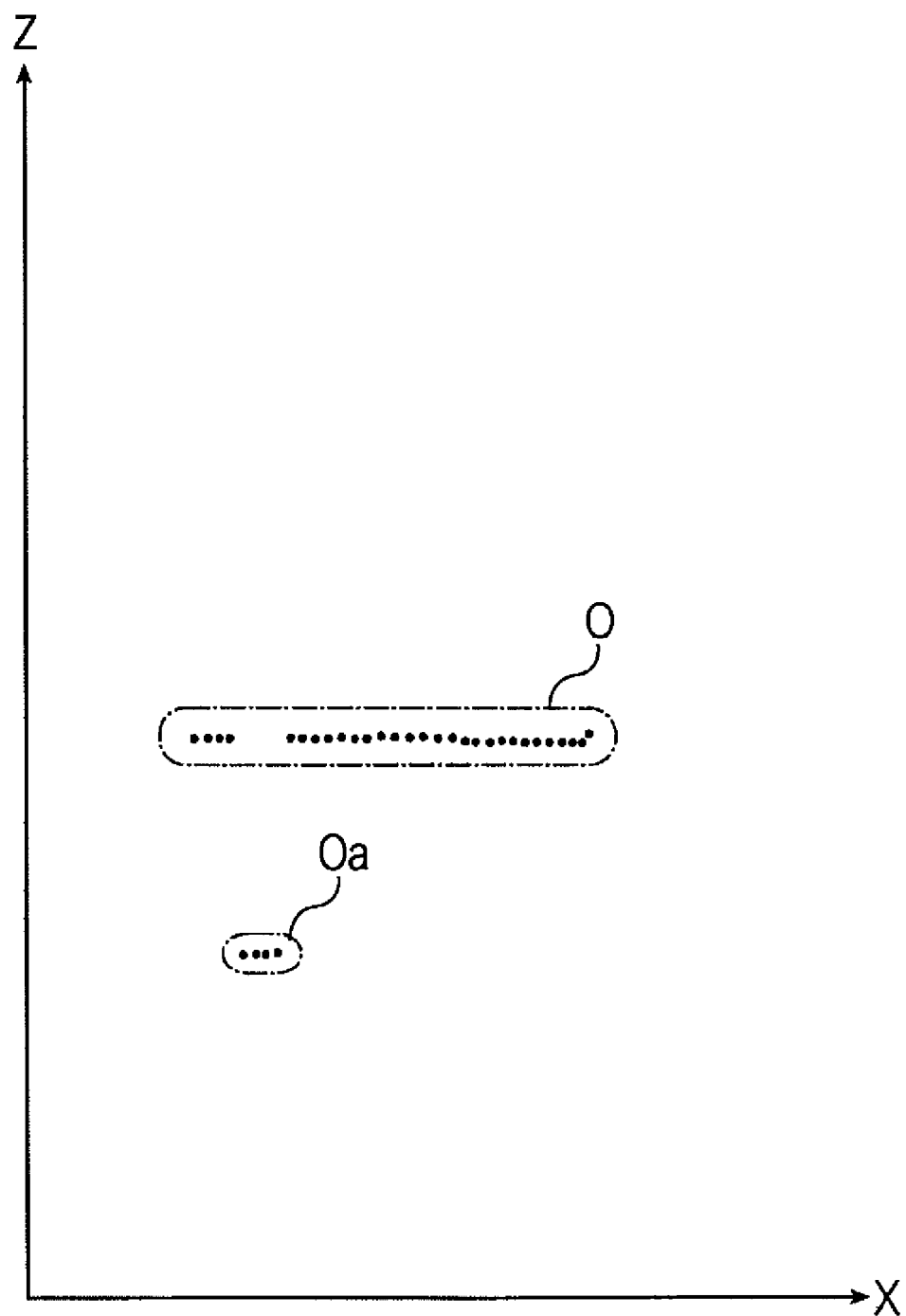
FIG. 25 shows that an object erroneously detected by mismatching is detected at a position closer than an original object.

For example, the erroneously detected object Oa shown in FIG. 25 appears in a part of the detected object O in the reference image $T_0$, as shown in FIG. 10A. In other words, instead of comparative pixel blocks $PB_C$ in a region Ra including a comparative pixel block $PB_C(a)$ that is supposed to be specified, comparative pixel blocks $PB_C$ in a region Rc including a comparative pixel block $PB_C(c)$ on the right side of the region Ra are erroneously specified in the comparative image $T_C$ corresponding to reference pixel blocks $PB_0$ belonging to the region Oa that is supposed to be detected as the same object as the object O in the reference image $T_0$, as shown in FIG. 10B.

Figure 24:
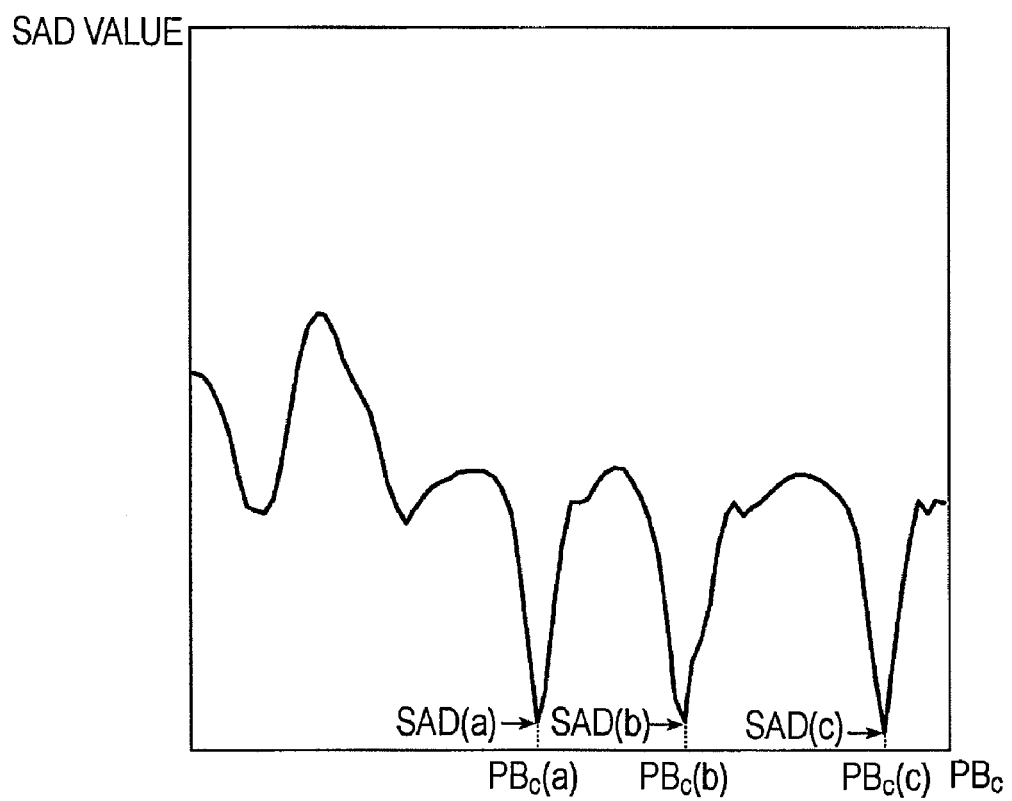
FIG. 24 is an example of a graph showing a SAD value obtained when stereo matching is performed on the basis of the reference image shown in FIG. 23A and the comparative image shown in FIG. 23B.

The mismatched region Rc will now be viewed in more detail. In the comparative image $T_C$, the region Ra that is supposed to be matched exists on the left side of the region Rc. As shown in FIG. 10B, at least the comparative pixel block $PB_C(a)$ that is supposed to be specified exists on the outer left side of the region Rc on an epipolar line EPL to which the comparative pixel block $PB_C(c)$ erroneously specified by mismatching belongs. In the comparative pixel block $PB_C(a)$, the local minimum SAD value SAD(a) that is equivalent to SAD(c) is given, and a downward-pointing peak appears, as shown in the graph of FIG. 24. In this case, the local minimum value SAD(b) is also given and a downward-pointing peak appears in a comparative pixel block $PB_C(b)$, as shown in FIG. 24.

Figure 11:
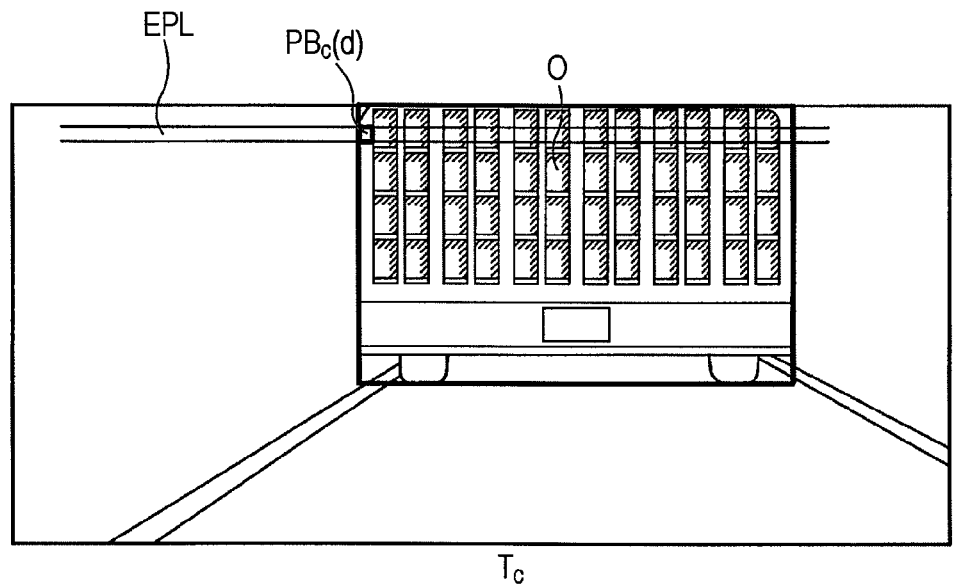
FIG. 11 shows a region in the comparative image properly matched with the detected object shown in FIG. 10A.
Figure 12:
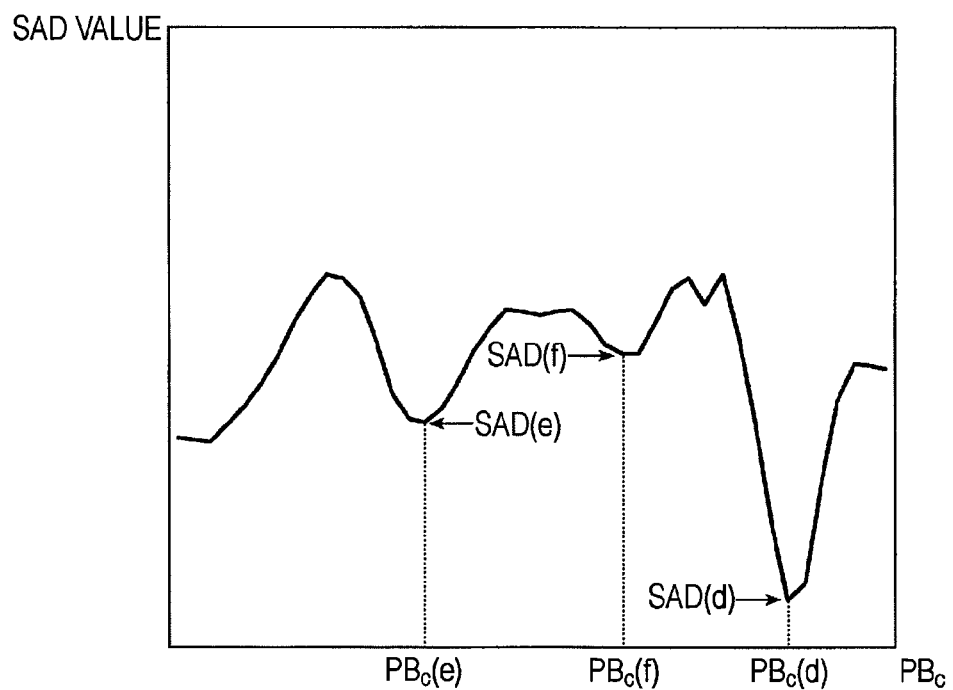
FIG. 12 is an example of a graph showing a SAD value given when stereo matching is performed again for a properly detected object.

On the other hand, the properly detected object O will be viewed. As shown in FIG. 11, the region O is properly matched in the comparative image $T_C$. For example, considering a reference pixel block $PB_0(q)$ that belongs to a left end portion of the region O of the object O shown in FIG. 10A, the SAD value changes on the left side of a comparative pixel block $PB_C(d)$ specified corresponding to the reference pixel block $PB_0(Q)$ on an epipolar line EPL in the comparative image $T_C$ including the comparative pixel block $PB_C(d)$, as shown in FIG. 12 serving as a graph.

In other words, besides the specified comparative pixel block $PB_C(d)$, comparative pixel blocks $PB_C$, such as comparative pixel blocks $PB_C(e)$ and $PB_C(f)$ that provide the local minimum SAD value exist. SAD values SAD(e) and SAD(f) of the comparative pixel blocks $PB_C(e)$ and $PB_C(f)$ are larger than the SAD value SAD(d) of the specified comparative pixel block $PB_C(d)$.

In this embodiment, using the above-described characteristic of the SAD value provided when an image of the object O, in which similar luminance patterns are arranged at regular intervals, is taken, the determination means 11 sets regions in which the detected objects are enclosed by rectangular frames in the reference image $T_0$. The determination means 11 selects reference pixel blocks $PB_0$ (for example, reference pixel blocks $PB_0(q)$ and $PB_0(p)$) belonging to the left end portions of the regions (for example, regions O and Oa in FIG. 10A), and performs stereo matching again for regions on the left sides of comparative pixel blocks $PB_C$ (for example, $PB_C(d)$ and $PB_C(c)$), which are specified in the comparative image $T_C$ corresponding to the reference pixel blocks $PB_0(q)$ and $PB_0(p)$, on the epipolar line EPL including the comparative pixel blocks $PB_C$.

When a comparative pixel block $PB_C$, which is different from the specified comparative pixel blocks $PB_C$ ($PB_C(d)$, $PB_C(c)$) and provides the local minimum SAD value less than or equal to a preset threshold value, is detected, it is determined that the object is mismatched. The threshold value is set at an appropriate value beforehand.

In this case, when the determination means 11 selects a reference pixel block $PB_0(p)$ belonging to the left end portion of the region Oa in FIG. 10A, it performs stereo matching again for a region on the left side of a comparative pixel block $PB_C(c)$, which is specified in the comparative image $T_C$ corresponding to the pixel block $PB_0(p)$, on an epipolar line EPL including the comparative pixel block $PB_C(c)$, as shown in FIG. 10B. Then, as shown in the graph of FIG. 24, comparative pixel blocks $PB_C(a)$ and $PB_C(b)$, which are different from the specified comparative pixel block $PB_C(c)$ and provide the local minimum SAD values SAD(a) and SAD(b) less than or equal to the preset threshold value, are detected. Therefore, the determination means 11 determines that the object Oa is mismatched.

On the other hand, when the determination means 11 selects a reference pixel block $PB_0(q)$ belonging to the left end portion of the region O in FIG. 10A, it performs stereo matching again for a region on the left side of a comparative pixel block $PB_C(d)$, which is specified in the comparative image $T_C$ corresponding to the reference pixel block $PB_0(q)$, on an epipolar line EPL including the comparative pixel block $PB_C(d)$, as shown in FIG. 11. As shown in the graph of FIG. 12, comparative pixel blocks $PB_C(e)$ and $PB_C(f)$ have SAD values more than the preset threshold value, and a comparative pixel block $PB_C$, which is different from the specified comparative pixel block $PB_C(d)$ and provides the local minimum SAD value less than or equal to the preset threshold value, is not detected. Therefore, the determination means 11 determines that the object O is properly matched.

In this way, in this embodiment, the determination means 11 sets a region enclosed by a rectangular frame and including an images of each detected object in the reference image $T_0$, and performs stereo matching again on an epipolar line EPL on the left side of a comparative pixel block $PB_C$ specified in the comparative image $T_C$ corresponding to the reference pixel block $PB_0$ belonging to the left end portion of the regions. Depending on whether there is a comparative pixel block $PB_C$ that is different from the specified comparative pixel block $PB_C$ and provides a downward-pointing peak in the graph of the SAD value, it is determined whether each object is mismatched.

However, in this case, when mismatching occurs in a direction opposite the direction of mismatching shown in FIGS. 10A ad 10B, the determination means 11 does sometimes not operate properly.

Figure 13A:
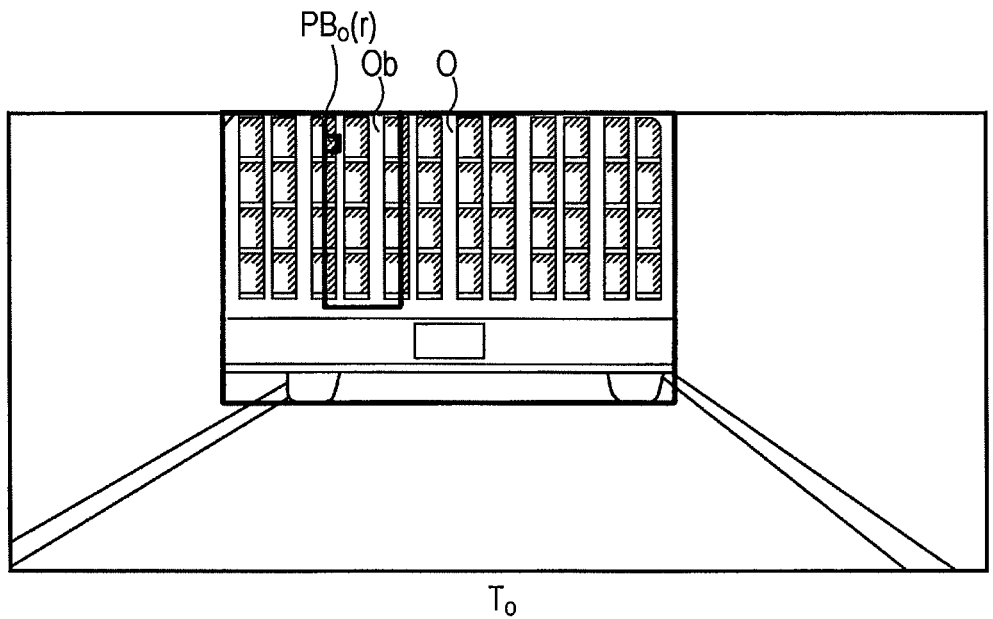
FIG. 13A shows an object erroneously detected in the reference image.
Figure 13B:
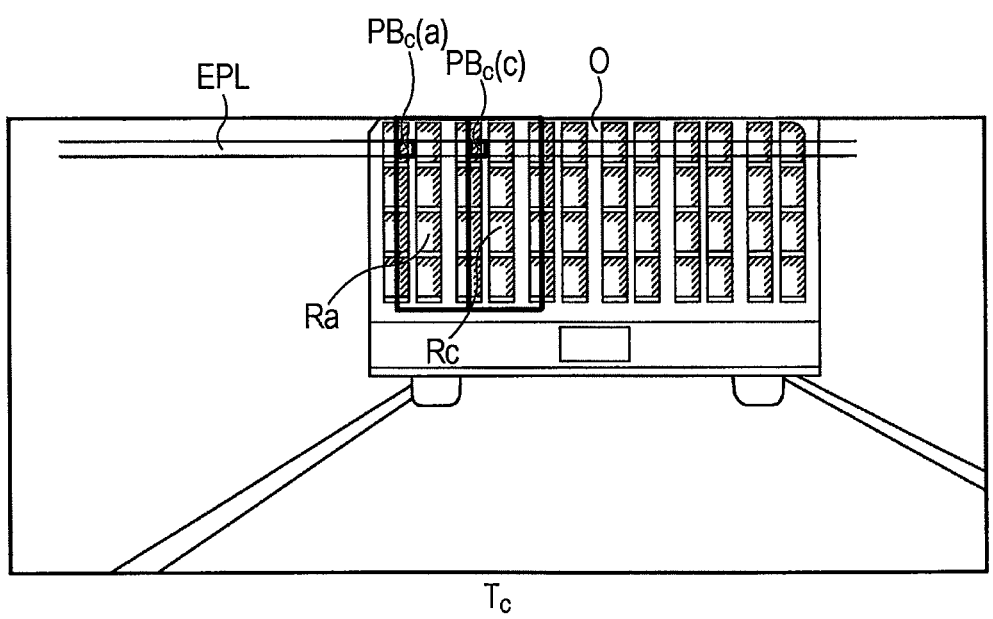
FIG. 13B shows a region mismatched with the erroneously detected object and a region to be matched in the comparative image.

For example, when a comparative pixel block $PB_C(a)$ is specified in the comparative image $T_C$ corresponding to a reference pixel block $PB_0(r)$ in the reference image $T_0$ and a part Ob of an object O in the reference image $T_0$ is mismatched as a region Ra on the left side of a region Rc that is supposed to be specified in the comparative image $T_C$, as shown in FIGS. 13A and 13B, the object Ob is erroneously detected by mismatching.

Despite this, when stereo matching is performed again on an epipolar line EPL on the left side of the comparative pixel block $PB_C(a)$ specified in the comparative image $T_C$ corresponding to the reference pixel block $PB_0(r)$ in the region Ob, a comparative pixel block $PB_C$, which provides the local minimum SAD value less than or equal to the preset threshold value, is not detected except for the specified comparative pixel block $PB_C(a)$. Therefore, the determination means 11 does not determine that the object Ob is detected by mismatching.

Figure 14:
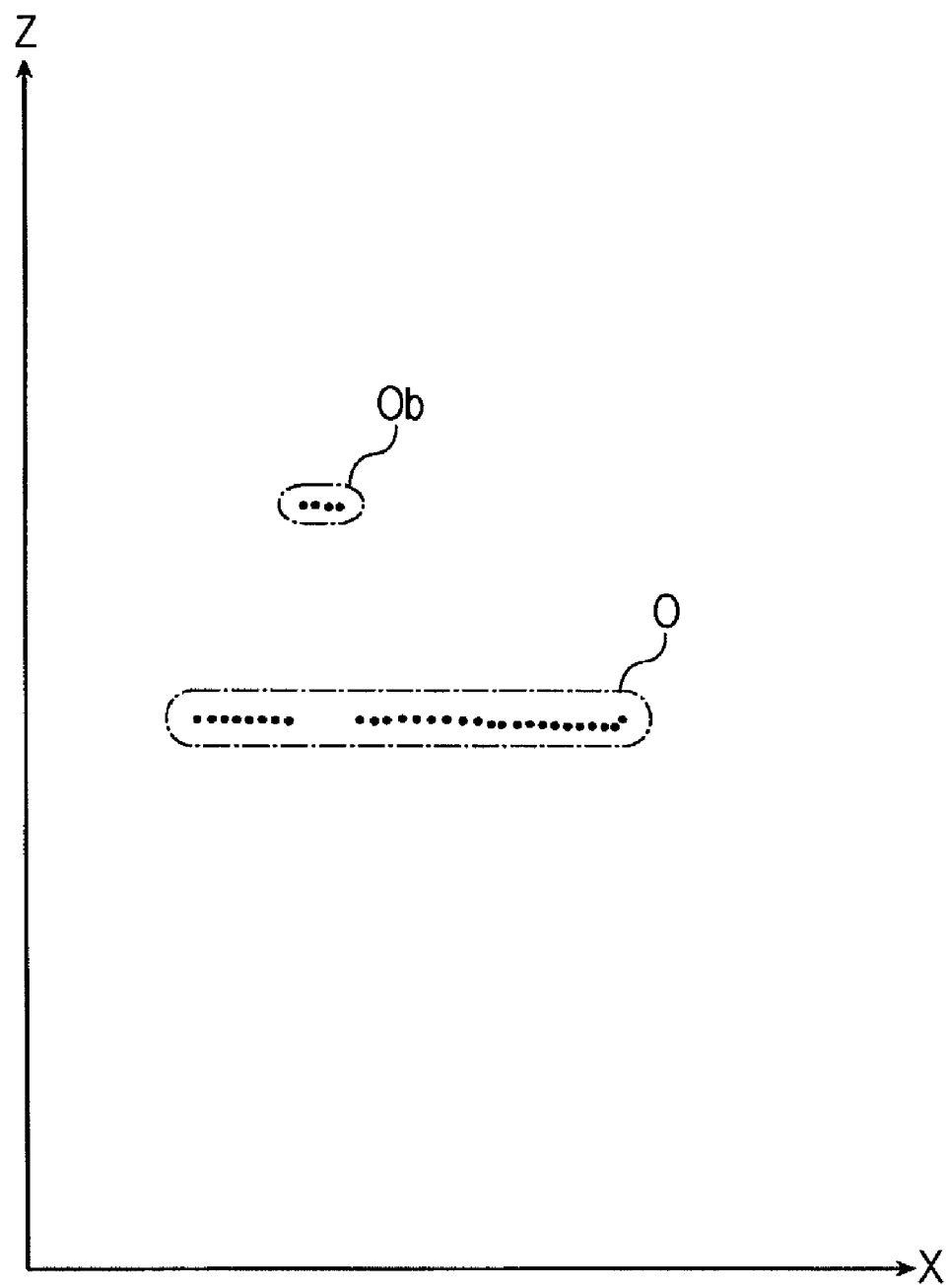
FIG. 14 explains that the erroneously detected object shown in FIG. 13 is detected at a position farther than an original object.

In this case, when parallaxes dpn of sections Dn belonging to the region of the erroneously detected object Ob are converted into distances Zn in real space and are plotted in real space, the object Ob is erroneously detected at a position farther than the original object O, as shown in FIG. 14. When the object detecting system 1 is mounted in the vehicle so as to detect objects on and around the road, as in this embodiment, if the object Ob is erroneously detected at a position closer than the original object O, as shown in FIG. 25, the preceding-vehicle follow-up system starts and sudden braking is automatically performed. In contrast, even when the object Ob is erroneously detected at a position farther than the original object O, there is no serious problem as long as the object O has been detected reliably.

It can be determined whether mismatching occurs in a direction opposite the direction of mismatching shown in FIGS. 10A and 10B, as shown in FIGS. 13A and 13B, by performing stereo matching again in a region on a side opposite the above side, that is, on the right side on the epipolar line EPL in the comparative image $T_C$.

Figure 15A:
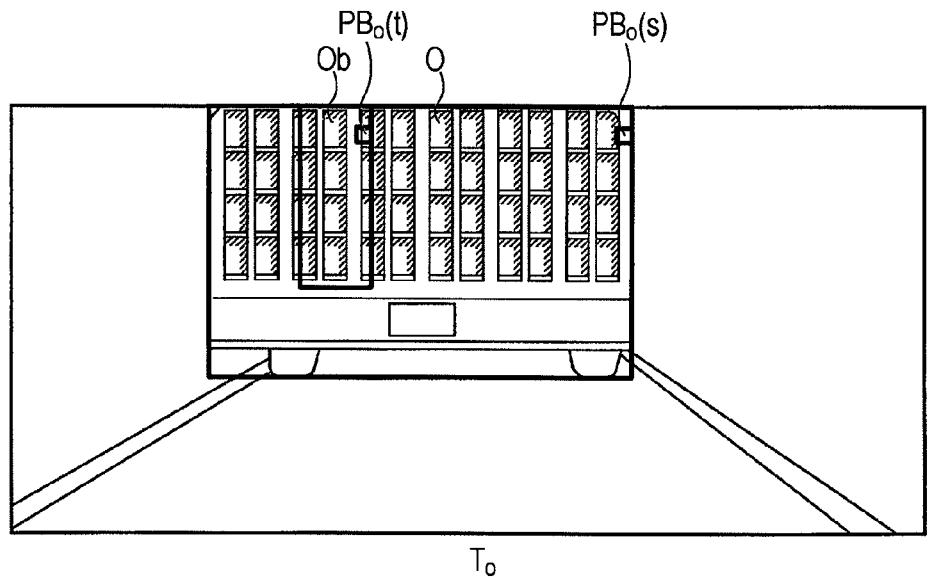
FIG. 15A shows an object erroneously detected in the reference image, and FIG. 15B explains how stereo matching is performed again in the comparative image when erroneous detection shown in FIG. 13 occurs.
Figure 15B:
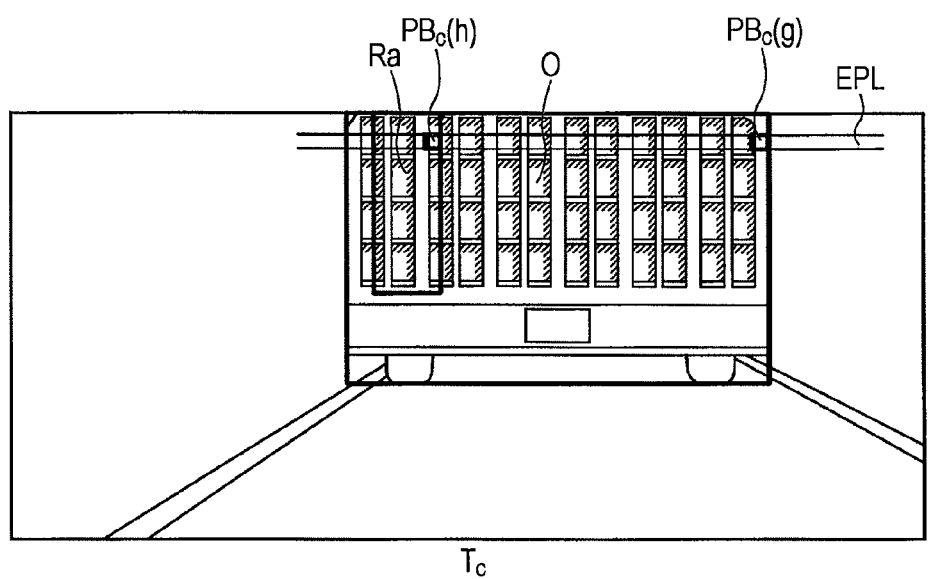

In other words, the determination means 11 selects a reference pixel block $PB_0$ (for example, a reference pixel block PB$_0$(s), PB$_0$(t)) belonging to the right end portion of a region (for example, a region O, Ob in FIG. 15A) enclosed by a frame in the reference image T$_0$ corresponding to a detected object, and performs stereo matching again on an epipolar line EPL for a region on the right side of a comparative pixel block PB$_C$ (for example, a comparative pixel block PB$_C$(g), PB$_C$(h) in FIG. 15B) specified in the comparative image T$_C$ corresponding to the reference pixel block PB$_0$ (for example, PB$_0$(s), PB$_0$(t)). When a comparative pixel block PB$_C$, which is different from the specified comparative pixel block PB$_C$ (PB$_C$(g), PB$_C$(h)) and provides the local minimum SAD value less than or equal to the preset threshold value, is detected, it is determined that the object is detected by mismatching.

With this configuration, when the determination means 11 selects a reference pixel block PB$_0$(s) in a right end portion of the region O, as shown in FIG. 15A, it performs stereo matching again for a region on the right side of a comparative pixel block PB$_C$(g), which is specified in the comparative image T$_C$ corresponding to the reference pixel block PB$_0$(s), as shown in FIG. 15B, on an epipolar line EPL including the comparative pixel block PB$_C$(g). In this case, a comparative pixel block PB$_C$, which is different from the specified comparative pixel block PB$_C$(g) and provides the local minimum SAD value less than or equal to the preset threshold value, is not detected, similarly to the graph of FIG. 12. Therefore, the determination means 11 determines that the object O is matched properly.

For example, in a case in which the determination means 11 selects a reference pixel block PB$_0$(t) in a right end portion of the region Ob shown in FIG. 15A, when a comparative pixel block PB$_C$ matched with the reference pixel block PB$_0$(t) is a comparative pixel block PB$_C$(h), the determination means 11 performs stereo matching again for a region on the right side of the comparative pixel block PB$_C$(h), which is specified in the comparative image T$_C$ corresponding to the reference pixel block PB$_0$(t), on an epipolar line EPL including the comparative pixel block PB$_C$(h), as shown in FIG. 15B.

Figure 16:
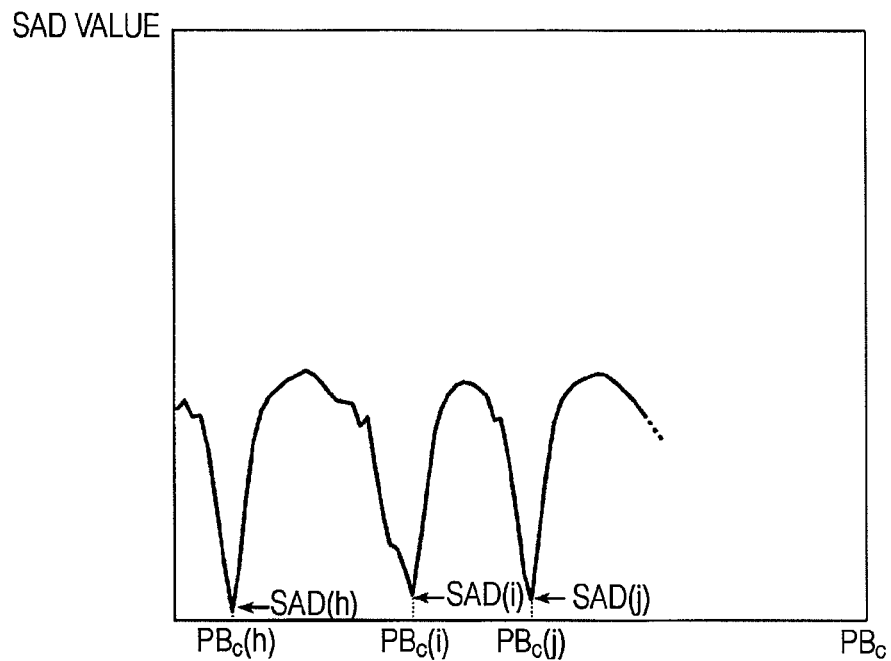
FIG. 16 is an example of a graph showing a SAD value calculated by stereo matching shown in FIG. 15B.

In this case, one or more comparative pixel blocks PB$_C$, which have luminance patterns similar to that of the comparative pixel block PB$_C$(h), exist on the epipolar line EPL on the right side of the comparative pixel block PB$_C$(h). Therefore, comparative pixel blocks PB$_C$(i), PB$_C$(j), . . . , which are different from the specified comparative pixel block PB$_C$(h) and provide the local minimum SAD values SAD(i), SAD(j), . . . less than or equal to the preset threshold value, are detected, as shown in FIG. 16. Accordingly, the determination means 11 determines that the object Ob is mismatched.

In this way, the determination means 11 can set a region enclosed by a rectangular frame and including an image of each detected object in the reference image T$_0$, and can perform stereo matching again on an epipolar line on the right side of a comparative pixel block PB$_C$ specified in the comparative image T$_C$ corresponding to a reference pixel block PB$_0$ belonging to the right end portion of the region. Depending on whether a comparative pixel block PB$_C$ that provides a downward-pointing peak in the graph of the SAD value exists besides the specified comparative pixel block PB$_C$, it can be determined whether the object is mismatched.

In the above-described judgment of mismatching by the determination means 11, one reference pixel block PB$_0$ (i.e., a reference pixel block PB$_0$(q), PB$_0$(p), PB$_0$(r)) is selected in the left end portion of each of the regions O, Oa, and Ob of objects detected in the reference image T$_0$, or one reference pixel block PB$_0$ (i.e., a reference pixel block PB$_0$(s), PB$_0$(t)) is selected in the right end portion of each of the regions O and Ob of the objects detected in the reference image T$_0$. However, the number of reference pixel blocks PB$_0$ selected in the right or left end portion of the region of each object is not limited to one. By selecting a plurality of reference pixel blocks PB$_0$ in the right or left end portion of the region of each object, more reliable judgment of mismatching is achieved.

When a plurality of reference pixel blocks PB$_0$ are selected in the right or left end portion of the region of each object in judgment of mismatching, stereo matching can be performed again for all reference pixel blocks PB$_0$ belonging to the right or left end portion. Alternatively, stereo matching can be performed again for a preset number of reference pixel blocks, of all reference pixel blocks PB$_0$ belonging to the right or left end portion.

Figure 17:
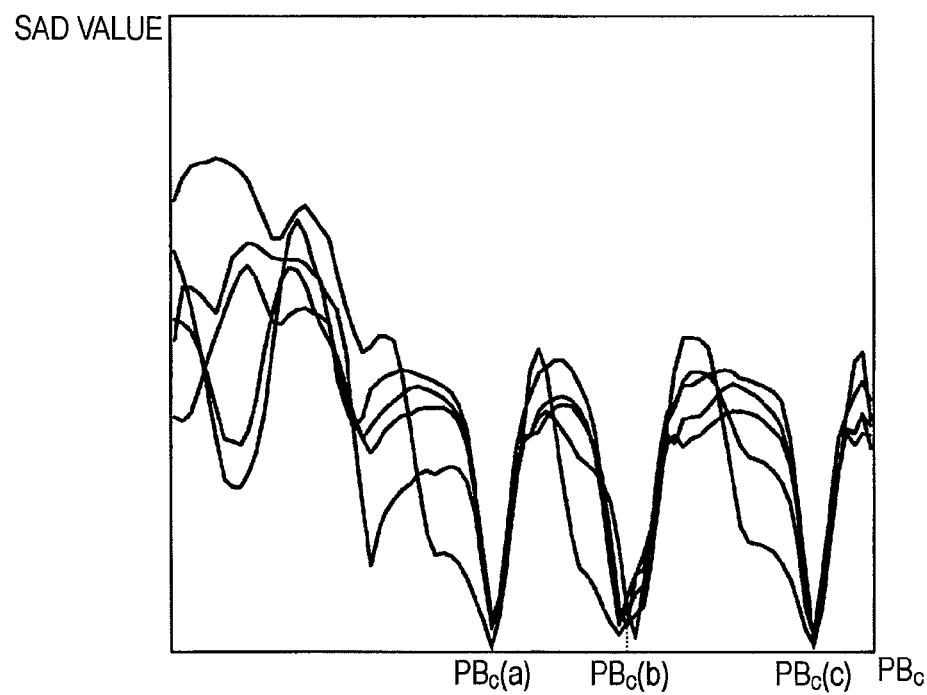
FIG. 17 is an example of a graph showing a SAD value calculated when stereo matching shown in FIG. 10B is performed for a plurality of reference pixel blocks in a region of an object.

In this case, for example, when a plurality of reference pixel blocks PB$_0$ including a reference pixel block PB$_0$(p) are selected as reference pixel blocks PB$_0$ belonging to the left end portion of the region Oa of the erroneously detected object Oa shown in FIG. 10A, and are subjected again to stereo matching, the positions of comparative pixel blocks PB$_C$ having the local minimum SAD value less than or equal to the threshold value concentrate near at least comparative pixel blocks PB$_C$(a), PB$_C$(b), and PB$_C$(c), as shown in FIG. 17.

In this way, when the positions of the comparative pixel blocks PB$_C$, which are different from the specified comparative pixel block PB$_C$(c) and provide the local minimum SAD values less than or equal to the threshold value, concentrate near the comparative pixel blocks PB$_C$(a), PB$_C$(b), etc., the object Oa is judged as mismatched. This allows more reliable judgment of mismatching.

In this case, the above-described concentration does not always need to occur in all reference pixel blocks PB$_0$ or a predetermined number of reference pixel blocks PB$_0$ belonging to the right or left end portion of the region of the object. When the above-described concentration occurs in more than a predetermined number or a predetermined percentage of reference pixel blocks PB$_0$, of the selected reference pixel blocks PB$_0$, it can be determined whether the object Oa is mismatched.

The determination means 11 stores various information in the memory in correspondence with the objects. For example, the information includes information about the position of a comparative pixel block PB$_C$(d) (see FIG. 12) in the comparative image T$_C$ corresponding to the downward-pointing peak that provides the local minimum SAD value less than or equal to the threshold value on an epipolar line EPL for an object that is judged as properly matched, like the object O shown in FIG. 10A, and information about the positions of comparative pixel blocks PB$_C$(a), PB$_C$(b), and PB$_C$(c) (see FIG. 24) in the comparative image T$_C$ corresponding to the downward-pointing peaks that provide the local minimum SAD values less than or equal to the threshold value on an epipolar line EPL for an object that is judged as mismatched, like the object Oa shown in FIG. 10A.

For example, the object that is judged as mismatched by the determination means 11 can be removed from all detected objects. In this case, the determination means 11 deletes information about the object judged as mismatched, from information about the objects stored in the memory by the grouping means 10.

However, as shown in FIGS. 24, 16, and 17, in the SAD value graph obtained by stereo matching performed again for judgment of mismatching, a comparative pixel block PB$_C$ (for example, a comparative pixel block PB$_C$(a) in FIG. 24) that is supposed to be specified is sometimes included in comparative pixel blocks PB$_C$ that provide the local minimum SAD values and downward-pointing peaks.

Accordingly, in this embodiment, it is judged, by using the result of stereo matching performed again, whether an erroneously detected object can be combined with another detected object.

A description will be given below of a case in which the result of stereo matching performed again for one reference pixel block $PB_0$ belonging to a left end portion of a region of an erroneously detected object is used. This description also applies to a case in which the result of stereo matching performed again for a reference pixel block $PB_0$ belonging to a right end portion is used, and to a case in which the result of stereo matching performed again for a plurality of reference pixel blocks $PB_0$ belonging to the right or left end portion of the region of the object is used.

More specifically, by performing stereo matching again on an epipolar line including a comparative pixel block $PB_C$ that is specified in the comparative image $T_C$ corresponding to a reference pixel block $PB_0$ belonging to a left end portion of a region including an image of an object judged as mismatched, the determination means 11 first calculates a parallax dp from the position of a comparative pixel block $PB_C$ which is different from the specified comparative pixel block $PB_C$ and provides the local minimum SAD value less than or equal to the threshold value, and the position of the original reference pixel block $PB_0$ in the reference image $T_0$.

Subsequently, in a case in which the object judged as mismatched exists at a distance Z in real space calculated on the basis of the calculated parallax dp, when the distance Z coincides with the distance in real space of any other detected object within a predetermined error range, the determination means 11 determines that the object judged as mismatched is the same as the other object.

In stereo matching performed again on an epipolar line EPL including a comparative pixel block $PB_C(c)$ specified in the comparative image $T_C$ corresponding to a reference pixel block $PB_0(p)$ belonging to a left end portion of a region Oa of an object Oa judged as mismatched in FIGS. 10A and 10B, parallaxes dp(a) and dp(b) are calculated from the positions in the comparative image $T_C$ of comparative pixel blocks $PB_C(a)$ and $PB_C(b)$, which are different from the specified comparative pixel block $PB_C(c)$ and provide the local minimum SAD values SAD(a) and SAD(b) less than or equal to the threshold value (see FIG. 24), and the position of the original reference pixel block $PB_0(p)$ in the reference image $T_0$.

Figure 18:
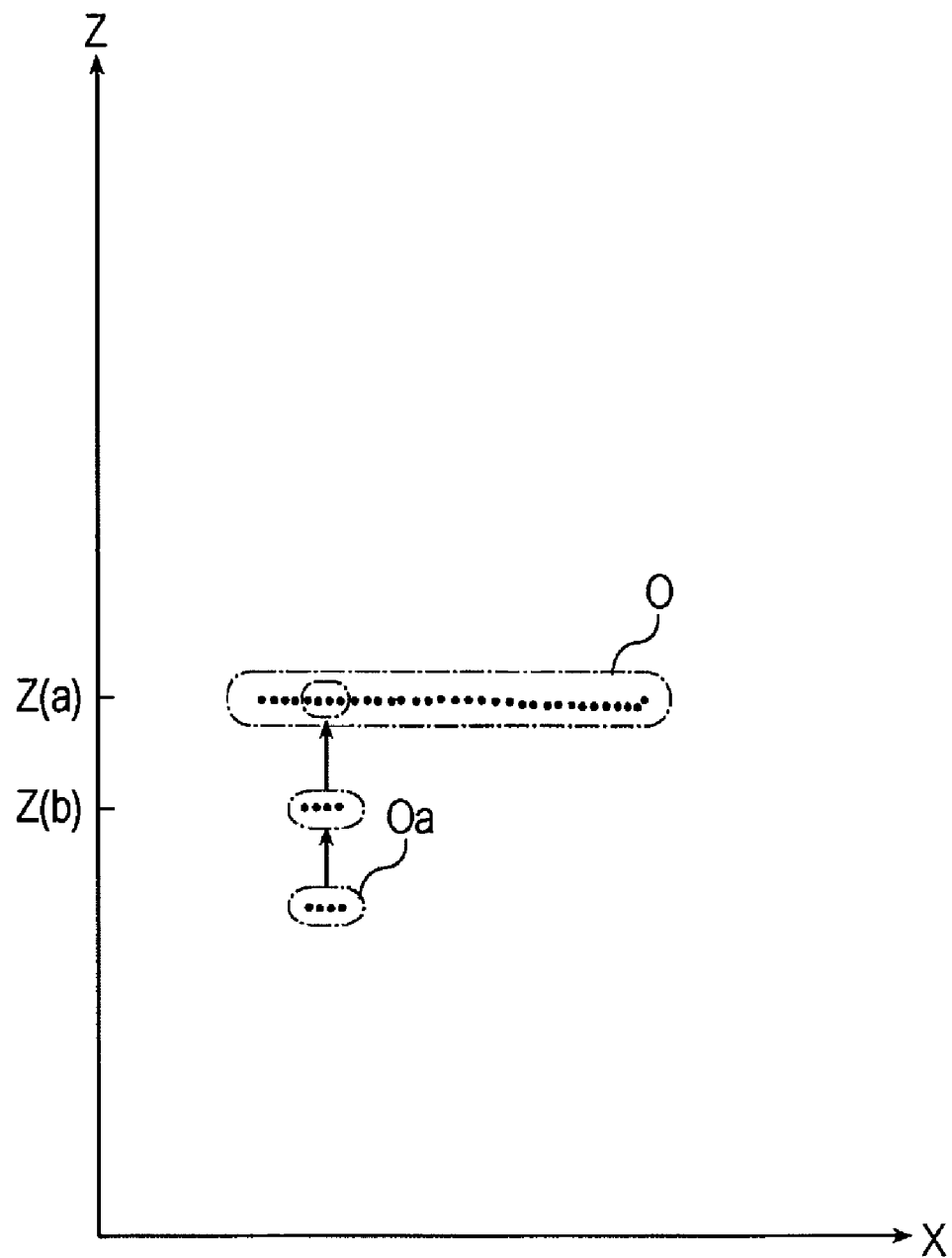
FIG. 18 explains that the distance of a mismatched object coincides with the distance of another object.
Figure 19:
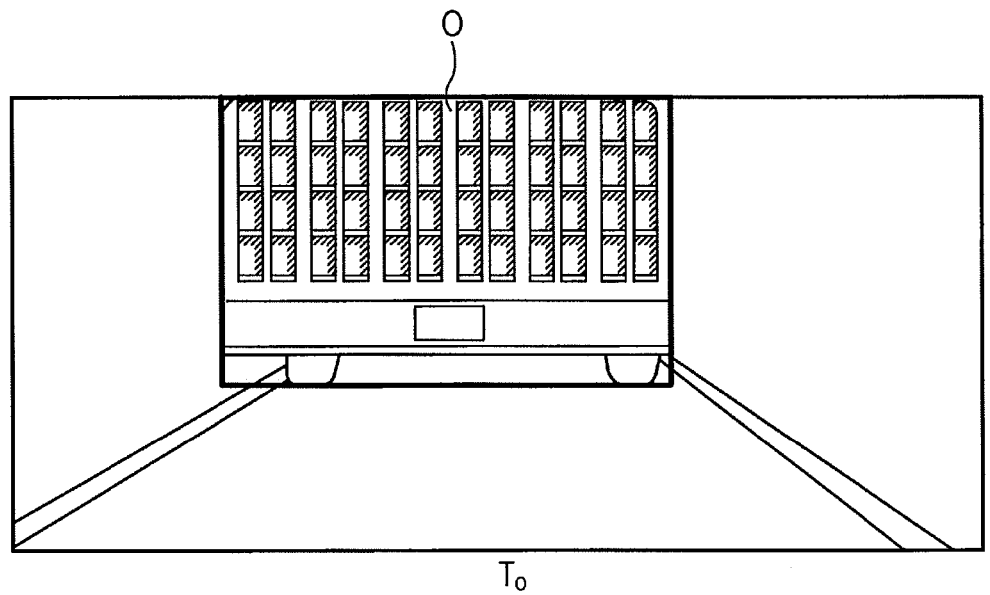
FIG. 19 shows an object that is finally detected as one object in the reference image.

Then, distances Z(a) and Z(b) in real space are calculated from the parallaxes dp(a) and dp(b) according to Expression (4) described above. When the object Oa judged as mismatched exists at the distance Z(b), as shown in FIG. 18, it is difficult to judge that the distance z(b) coincides with the distance of another object O in real space. In contrast, when the object Oa exists at the distance Z(a), it can be judged that the distance Z(a) coincides with the distance of the object O in real space within a predetermined error range. Therefore, in this case, the determination means 11 determines that the object Oa judged as mismatched is the same as the object O, combines the object O and the object Oa, and detects the objects as one object O, as shown in FIG. 19.

In this way, when there are a plurality of comparative pixel blocks $PB_C$ that are different from the specified comparative pixel block $PB_C$ and provide the local minimum SAD values less than or equal to the threshold value, the above-described judgment of coincidence is performed for all comparative pixel blocks $PB_C$ except for the specified comparative pixel block $PB_C$.

Figure 20:
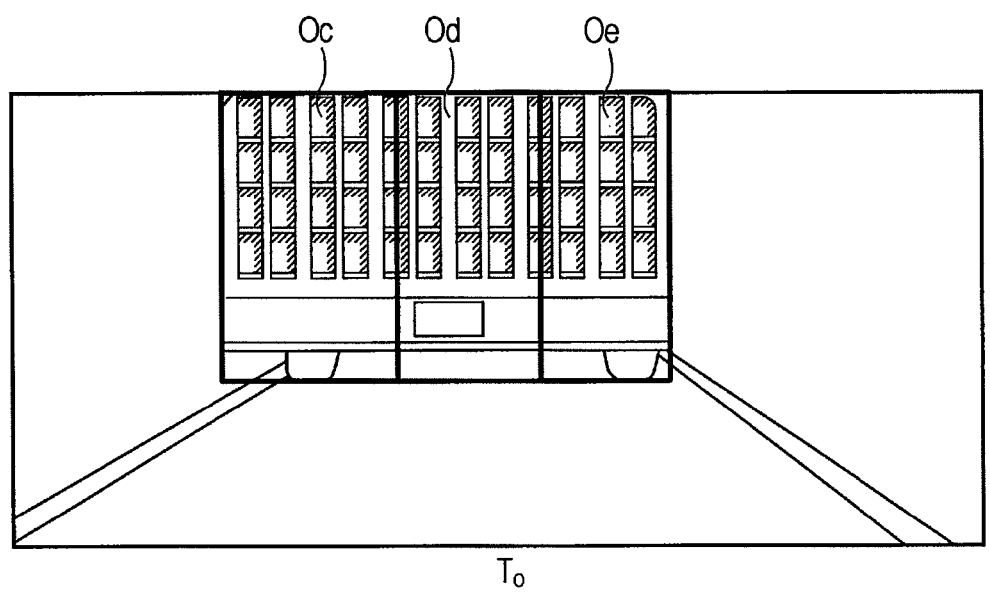
FIG. 20 shows an object that is detected as a plurality of objects because of mismatching.
Figure 21A:
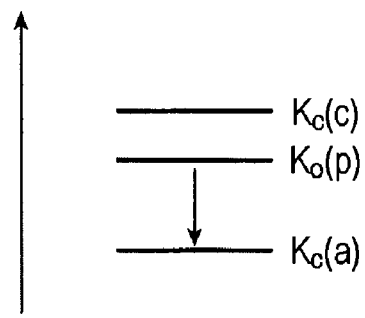
FIGS. 21A to 21D are graphs showing the relationship among average luminances of all pixels belonging to an erroneously specified comparative pixel block, a comparative pixel block to be specified, and an original reference pixel block.
Figure 21B:
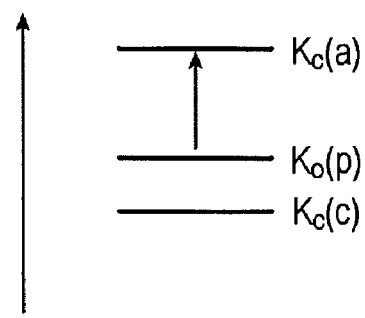
Figure 21C:
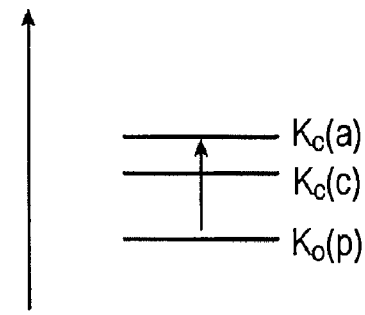
Figure 21D:
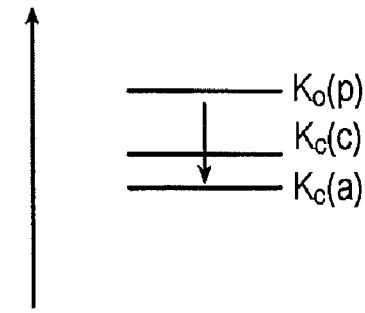

As shown in FIG. 20, a region of an object that should be detected as one object in the reference image $T_0$ is sometimes detected as a plurality of objects Oc, Od, and Oe because of mismatching of a part of the region.

In this case, stereo matching is also performed again for a region on the left side of a comparative pixel block $PB_C$, which is specified in the comparative image $T_C$ corresponding to a reference pixel block $PB_0$ belonging to a left end portion of a region Oc of the leftmost object Oc, on an epipolar line EPL including the specified comparative pixel block $PB_C$, thus obtaining a SAD value graph shown in FIG. 12. On the basis of the graph, it is confirmed that a comparative pixel block $PB_C$, which is different from the specified comparative pixel block $PB_C$ and provides the local minimum SAD value less than or equal to the preset threshold value, is not detected, and that the object Oc is matched properly.

Stereo matching is similarly performed again for the object Od. A parallax dp is calculated from the position of a comparative pixel block $PB_C$, which is different from the specified comparative pixel block $PB_C$ and provides the local minimum SAD value less than or equal to the threshold value, in the comparative image $T_C$ and the position of the original reference pixel block $PB_0$ in the reference image $T_0$. It is determined, on the basis of a distance Z calculated from the parallax dp, whether the object Od can be combined with the object Oc, and then, the object Od and the object Oc are combined into one object.

Stereo matching is also performed for the object Oe, and it is determined whether the object Oe can be combined with the combined objects Oc and Od. By finally combining the objects Oc, Od, and Oe, one object O can be detected, as shown in FIG. 19.

While detection of an object extending in the vehicle width direction (X-axis direction) has been described in the embodiment, as shown in FIG. 19, for example, the detection method is similarly applicable to an object S ([Side Wall S1] to [Side Wall S6]) labeled with "Side Wall" and extending in the vehicle length direction (Z-axis direction), as shown in FIG. 9.

In a case in which a plurality of objects are detected in the reference image $T_0$, as shown in FIG. 9, for example, even when an object O6 is judged as mismatched by the above-described processing, it is clearly impossible to combine the object O6 with an object O2 existing at a similar distance Z.

Therefore, in this embodiment, an object judged for coincidence limited to an object detected near the object judged mismatched in the reference image $T_0$. More specifically, it is necessary that a frame representing the object judged mismatched and a frame representing the another object are in common in the reference image $T_0$ or that the frames are at least in contact with each other. Alternatively, judgment of coincidence can be made for an object that exists within a predetermined distance range from the frame representing the object judged mismatched in the reference image $T_0$.

When the object judged mismatched and another object are combined into one object, the determination means 11 combines information about the judged object with information about the another object, of information about the objects stored in the memory by the grouping means 10. As necessary, the determination means 11 performs again linear approximation of information about the object obtained by combination, and stores the coordinates of end points and midpoint of the object in the memory.

In this case, as necessary, the determination means 11 recalculates the coordinates of the vertex of the frame of the combined object in the reference image $T_0$, and stores, in the memory, the another object before combination in correspondence with a comparative pixel block $PB_C$ corresponding to the downward pointing peak that provides the local minimum SAD value less than or equal to the threshold value on the epipolar line EPL in the comparative image $T_C$.

Image data on the reference image $T_0$ and the comparative image $T_C$ are transmitted from the main camera 2a and the sub-camera 2b in the stereo-image taking means 2 at a sampling period of several tens to several hundreds of milliseconds. It is unlikely that the position of the comparative pixel block $PB_C$, which is supposed to be specified, greatly changes on the epipolar line EPL in the comparative image $T_C$ between an image of the detected object taken in the previous sampling period and an image taken in the current sampling period.

Therefore, when information about the comparative pixel block $PB_C$, which corresponds to the downward-pointing peak that provides the local minimum value less than or equal to the threshold value, obtained by stereo matching performed again for the object judged mismatched in the current sampling period includes information close to information about the comparative pixel block $PB_C$, which corresponds to the downward-pointing peak that provides the local minimum value less than or equal to the threshold value, obtained by stereo matching performed again in the previous sampling period for the object detected in the previous sampling period for the object judged mismatched, the determination means 11 improves reliability of determination in the current sampling period that the object is mismatched.

More specifically, consideration will be taken of a case in which a part of the object O detected in the previous sampling period, as shown in FIG. 19 is detected as another object Oa because of mismatching at the current sampling period, as shown in FIG. 10A. When a SAD value graph shown in FIG. 24 is obtained by stereo matching performed again in the current sampling period, a downward-pointing peak that has a vertex at the comparative pixel block $PB_C(a)$, which is supposed to be specified, or at a comparative pixel block $PB_C$ very close to the comparative pixel block $PB_C(a)$ would have appeared in the previous sampling period, and a comparative pixel block $PB_C$ corresponding thereto would have been specified.

Therefore, if a comparative pixel block $PB_C(c)$ is erroneously specified by stereo matching and a downward-pointing peak appears in the comparative pixel block $PB_C(a)$ at the current sampling period, and a downward-pointing peak has appeared in the comparative pixel block $PB_C(a)$ in stereo matching performed again in the previous sampling period, it is highly likely that the comparative pixel block $PB_C(c)$ would have been erroneously specified in the current sampling period.

For this reason, in this case, the determination means 11 further increases judgment accuracy by improving reliability of judgment for the object judged mismatched in the current sampling period.

As described above, when there is an object that is judged mismatched and is not combined with another object, the determination means 11 stores, in the memory, the object in correspondence with information that the object is mismatched and the reliability of judgment. Further, the determination means 11 reads out and outputs information about objects thus detected (including an object judged mismatched) from the memory, as necessary.

Object mismatching is caused by erroneously specifying a comparative pixel block $PB_C$ corresponding to a downward-pointing peak that provides the local minimum value less than or equal to the threshold value on the epipolar line EPL in the comparative image $T_C$. In this case, the comparative pixel block $PB_C$ is specified on the basis of a SAD value calculated as a difference in luminance pattern according to Expression (1) described above, where p1st represents the luminance of the pixel in the reference pixel block $PB_0$ and p2st represents the luminance of the pixel in the comparative pixel block $PB_C$.

When object mismatching is caused by erroneously specifying a comparative pixel block $PB_C(c)$ by stereo matching in the current sampling period, for example, the luminances in the reference image $T_0$ and the comparative image $T_C$ can be corrected on the basis of the SAD value calculated as the difference in luminance pattern so as to prevent erroneous specification in stereo matching in the next sampling period.

More specifically, for example, when a SAD value graph shown in FIG. 24 is obtained by stereo matching performed again in the current sampling period, the determination means 11 calculates the average value $K_C(c)$ of luminances p2st of all pixels belonging to the erroneously specified comparative pixel block $PB_C(c)$, and calculates the average value $K_C(a)$ of luminances p2st of all pixels belonging to the comparative pixel block $PB_C(a)$ that is supposed to be specified. Further, the determination means 11 calculates the average value $K_0(p)$ of luminances p1st of all pixels belonging to the original reference pixel block $PB_0(p)$ in the reference image $T_0$ corresponding to the comparative pixel block $PB_C(c)$.

In the above-described situation where the comparative pixel block $PB_C(a)$ is not specified, but the comparative pixel block $PB_C(c)$ is erroneously specified corresponding to the reference pixel block $PB_0(p)$, it is normally considered that there are relationships among the average luminances $K_C(c)$, $K_C(a)$, and $K_0(p)$ as shown in FIGS. 21A to 21D serving as graphs. In all graphs of FIGS. 21A to 21D, the average value $K_C(c)$ is closer to the average value $K_0(p)$ than the average value $K_C(a)$.

In FIGS. 21A to 21D, it can be considered that, when the average $K_0(p)$ is increased or decreased to be equal to the average value $K_C(a)$, the average value $K_C(a)$ becomes equal to the average value $K_0(p)$ and the average value $K_C(c)$ becomes different from the average value $K_0(p)$, and that the possibility that a correct comparative pixel block $PB_C$ will be specified corresponding to the reference pixel block $PB_0$ in the comparative image $T_0$ in the next sampling period is increased.

Therefore, the determination means 11 calculates the average value $K_C(c)$ of luminances P2st of all pixels belonging to the erroneously specified comparative pixel block $PB_C(c)$, the average value $K_C(a)$ of luminances p2st of all pixels belonging to the comparative pixel block $PB_C(a)$ that is supposed to be specified, and the average value $K_0(p)$ of luminances p1st of all pixels belonging to the original reference pixel block $PB_0(p)$. Then, the determination means 11 calculates a difference $K_C(a)-K_0(p)$, and transmits the difference to the A/D converter 3a and the image correction unit (see FIG. 1) described above, thus adding the difference to the luminance of image data in the reference image $T_0$.

Instead of adjusting the luminance of the image data in the reference image $T_0$ in accordance with the difference in the A/D converter 3a and the image correction unit 4, the image taking condition of the main camera 2a can be adjusted in accordance with the difference. Further, instead of or together with adjusting the luminance of the image data in the reference image $T_0$, the luminance of image data in the comparative image $T_C$ can be adjusted.

As described above, according to the object detecting system 1 of this embodiment, parallaxes dp are calculated by performing stereo matching in the stereo matching means 7 on the basis of the reference image $T_0$ and the comparative image $T_C$ taken by the stereo-image taking means 2, and are grouped by the grouping means 10, so that objects are detected on the reference image $T_O$ by the determination means 11.

In each section in the reference image $T_O$ including an image of an object, a reference pixel block $PB_O$ belonging to a right or left end portion of the section is selected, and stereo matching is performed again for an area on the right or left side of a comparative pixel block $PB_C$, which is specified in the comparative image $T_C$ corresponding to the reference pixel block $PB_O$, on an epipolar line EPL including the specified comparative pixel block $PB_C$. When a comparative pixel block $PB_C$, which is different from the specified comparative pixel block $PB_C$ and provides the local minimum difference, such as SAD value, less than or equal to the preset threshold value, is detected for the object, the determination means 11 judges the object mismatched.

With this configuration, for images of an object that have similar luminance patterns arranged at regular intervals and that are susceptible to mismatching, as shown in FIGS. 10A and 10B, when a comparative pixel block, which provides the local minimum difference less than or equal to the threshold value, is detected in an area on the right or left side of the specified comparative pixel block by stereo matching performed, the object is judged mismatched. This allows an object erroneously detected by mismatching to be distinguished accurately.

For this reason, for example, when the object detecting system 1 of this embodiment is mounted in the vehicle so as to follow the preceding vehicle, it is possible to avoid a situation where the preceding-vehicle follow-up system is started and unnecessary braking is automatically performed because of erroneous object detection. Moreover, by appropriately setting the threshold value, erroneous object detection due to mismatching can be distinguished easily and reliably.

While this embodiment has been described on the assumption that the threshold value is fixed, for example, the threshold value can be changed in each sampling period, or can be changed in accordance with the total luminances of the reference image $T_O$ and the comparative image $T_C$.

What is claimed is:

1. An object detecting system comprising:
   stereo-image taking means for simultaneously taking images of an object by a pair of right and left cameras mounted at the same height and outputting the images as a reference image and a comparative image;
   stereo matching means for performing stereo matching so that a reference pixel block having a predetermined number of pixels is set in the reference image and differences in luminance pattern between the reference pixel block and comparative pixel blocks are calculated according to a predetermined calculation expression, the comparative pixel blocks having the same shape as that of the reference pixel block on an epipolar line in the comparative image and being corresponding to the reference pixel block, and so that a comparative pixel block having the smallest difference is specified, the stereo matching means calculating a parallax from a position of the specified comparative pixel block in the comparative image and a position of the reference pixel block in the reference image, the parallax being calculated for each reference pixel block;
   grouping means for grouping the parallaxes regarded as corresponding to the same object on the basis of the parallaxes of the reference pixel blocks; and
   determination means for detecting objects in the reference image on the basis of the grouped parallaxes and setting regions including images of the objects, selecting a reference pixel block belonging to a left end portion or a right end portion of each of the regions, performing stereo matching again for an area on the right or left side of a comparative pixel block, which is specified in the comparative image corresponding to the reference pixel block, on an epipolar line including the specified comparative pixel block, and determining that the object in the region is mismatched when a comparative pixel block that is different from the specified comparative pixel block and provides the minimum difference less than or equal to a preset threshold value is detected.

2. The object detecting system according to claim 1, wherein the predetermined calculation expression is provided to calculate, as the difference, a SAD value of a luminance for all pixels in the reference pixel block and the comparative pixel block according to the following expression:

$$SAD = \sum_{s,t} |p1st - p2st|$$

where p1st represents the luminance of the pixel in the reference pixel block and p2st represents the luminance of the pixel in the comparative pixel block.

3. The object detecting system according to claim 1,
   wherein the determination means performs stereo matching again for all of or a plurality number of reference pixel blocks, of the reference pixel blocks belonging to the right or left end portion of the region including each of the objects detected in the reference image, and
   wherein the determination means judges the object mismatched when positions of the comparative pixel blocks that correspond to the reference pixel blocks and provide the minimum differences less than or equal to the threshold value concentrate in the comparative image.

4. The object detecting system according to claim 1, wherein the determination means removes the object judged mismatched from the detected objects.

5. The object detecting system according to claim 1,
   wherein, by the stereo matching performed again on the epipolar line including the comparative pixel block specified in the comparative image corresponding to the reference pixel block belonging to the right or left end portion of the region including the object judged mismatched, the determination means calculates a parallax from a position in the comparative image of the comparative pixel block that is different from the specified comparative pixel block and provides the minimum difference less than or equal to the threshold value and a position in the reference image of the reference pixel block, and
   wherein, when the object judged mismatched exists at a distance in real space calculated from the calculated parallax and when the distance coincides with a distance in real space of any other detected object within a predetermined error range, the determination means determines that the object judged mismatched is the same as the any other detected object.

6. The object detecting system according to claim 5, wherein, when a plurality of comparative pixel blocks that are different from the specified comparative pixel block and provide the minimum differences less than or equal to the threshold value exist, the judgment of coincidence is made for all comparative pixel blocks except the specified pixel block.

7. The object detecting system according to claim 5, wherein the any other detected object judged for coincidence is an object detected near the object judged mismatched in the reference image.

8. The object detecting system according to claim 1, wherein, when information about a comparative pixel block that provides the minimum difference less than or equal to the threshold value and is obtained by stereo matching performed again for an object judged mismatched in the current sampling period includes information close to information about a comparative pixel block that provides the minimum difference less than or equal to the threshold value and is obtained by stereo matching performed again for an object detected in the previous sampling period corresponding to the object judged mismatched, the determination means improves reliability of determination in the current sampling period that the object is mismatched.

9. The object detecting system according to claim 1, wherein the determination means increases or decreases the luminance of the reference image and/or the comparative image on the basis of the calculated difference.

* * * * *